(12) United States Patent
Van den Avont

(10) Patent No.: US 11,946,525 B2
(45) Date of Patent: Apr. 2, 2024

(54) IMPACT ABSORBING DEVICES AND PROCESSES OF OPERATION OF THE IMPACT ABSORBING DEVICES

(71) Applicant: Mark Louis Van den Avont, Arlington Heights, IL (US)

(72) Inventor: Mark Louis Van den Avont, Arlington Heights, IL (US)

(73) Assignee: Hexnest Inc., Arlington Heights, IL (US)

( * ) Notice: Subject to any disclaimer, the term of this patent is extended or adjusted under 35 U.S.C. 154(b) by 118 days.

(21) Appl. No.: 16/442,537

(22) Filed: Jun. 16, 2019

(65) Prior Publication Data

US 2019/0383347 A1 Dec. 19, 2019

Related U.S. Application Data

(60) Provisional application No. 62/686,565, filed on Jun. 18, 2018.

(51) Int. Cl.
*B32B 3/24* (2006.01)
*A63B 6/00* (2006.01)
(Continued)

(52) U.S. Cl.
CPC .............. *F16F 9/049* (2013.01); *A63B 6/00* (2013.01); *B32B 3/12* (2013.01); *B32B 3/266* (2013.01);
(Continued)

(58) Field of Classification Search
CPC .............. F16F 9/049; A63B 6/00; A63B 6/02
See application file for complete search history.

(56) References Cited

U.S. PATENT DOCUMENTS 4,137,583 A 2/1979 Baldwin et al.
5,562,573 A * 10/1996 Harinishi ................. A63B 6/00
5/420

(Continued)

FOREIGN PATENT DOCUMENTS

WO 2015197804 A1 12/2015

*Primary Examiner* — William P Watkins, III
(74) *Attorney, Agent, or Firm* — Neal Marcus

(57) ABSTRACT

An impact absorbing device is disclosed for reducing a force exerted against a falling object upon impact of a falling object, the device comprising: a first layer including one or more baffles configured to undergo compression in response to the impact of the falling object, wherein pressure is increased as a result of restriction of air displacement and/or contents in the one or more baffles upon the compression of the one or more baffles and wherein increased pressure in the one or more baffles increases compression resistance of the one or more baffles causing the one or more baffles to exert a force which decelerates the falling object; and a second layer including one or more baffles layered on the one or more baffles of the first layer, wherein the one or more baffles of the second layer are configured to undergo compression in response to the compression of the one or more baffles of the first layer, wherein pressure is increased in the one or more baffles as a result of restriction of air displacement and/or contents in the one or more baffles upon the compression of the one or more baffles and wherein increased pressure in the one or more baffles increases compression resistance of the one or more baffles causing the one or more baffles into contact the first layer and exert a force which decelerates said falling object.

18 Claims, 11 Drawing Sheets

(51) Int. Cl.
    *B32B 3/12*         (2006.01)
    *B32B 3/26*         (2006.01)
    *B32B 5/18*         (2006.01)
    *B32B 27/06*       (2006.01)
    *B32B 27/32*       (2006.01)
    *F16F 9/04*         (2006.01)

(52) U.S. Cl.
    CPC ................ *B32B 5/18* (2013.01); *B32B 27/06* (2013.01); *B32B 27/32* (2013.01); *F16F 9/0436* (2013.01); *F16F 9/0472* (2013.01); *A63B 2209/00* (2013.01); *B32B 2266/0228* (2013.01); *B32B 2307/56* (2013.01); *F16F 2224/02* (2013.01)

(56) References Cited

U.S. PATENT DOCUMENTS

| | | |
|---|---|---|
| 8,528,119 B2 | 9/2013 | Ferrara |
| 8,863,320 B2 | 10/2014 | Kelly et al. |
| 9,683,622 B2 | 6/2017 | Ferrara |
| 10,039,338 B2 | 8/2018 | Kelly et al. |
| 2006/0059606 A1* | 3/2006 | Ferrara .................. A42B 3/064 2/412 |
| 2013/0043627 A1 | 2/2013 | Chu |
| 2013/0086744 A1 | 4/2013 | Silverman |

\* cited by examiner

IMPACT ABSORBING DEVICES AND PROCESSES OF OPERATION OF THE IMPACT ABSORBING DEVICES

CROSS-REFERENCE TO RELATED APPLICATION FIELD OF THE INVENTION

This application claims priority to U.S. Provisional Application No. 62/686,565, filed on Jun. 18, 2018, entitled "Device for Reducing Force Exerted Against a Falling Object Upon Impact" which is incorporated by reference herein.

FIELD OF THE INVENTION

The present invention relates to impact absorbing devise and the process of operation of the impact absorbing devices.

BACKGROUND OF THE INVENTION

Impact absorbing devices such as impact absorbing mats are commonly used to prevent injuries from falls or tumbles in activities such as gymnastics, rock climbing, and any other activity where there is a risk of injury from falling from a height. Early impact absorbing devices include nets, spring beds, hay or cotton filled containers. Today, the most popular impact absorbing devices are foam based impact absorbing mats. Many of these devices largely consist of a block of foam or layers of foam, some of which include cavities, spaces or holes. Sealed air bladders are also a common impact absorbing device. Other examples of impact absorbing mats are disclosed in U.S. Pat. No. 4,137,583 to Baldwin, U.S. Pub. No. 20130043627 A1 to Chu, U.S. Pub. No. 2013/0086744 A1 to Silverman and WO2015197804 A1 to Lindsay. The ultimate goal of an impact absorbing device is to return as much force as the force produced by the object upon approach and impact. The return force should be consistent force over time to absorb the force or impact. However, most impact absorbing mats like these fail to provide the proper force as described.

BRIEF SUMMARY OF THE INVENTION

Impact absorbing devices and processes of operation of the impact absorbing devices are disclosed.

In accordance with an example of the present disclosure, an impact absorbing device is disclosed for reducing a force exerted against a falling object upon impact of a falling object, the device comprising: a first layer including one or more baffles configured to undergo compression in response to the impact of the falling object, wherein pressure is increased as a result of restriction of air displacement and/or contents in the one or more baffles upon the compression of the one or more baffles and wherein increased pressure in the one or more baffles increases compression resistance of the one or more baffles causing the one or more baffles to exert a force which decelerates the falling object; and a second layer including one or more baffles layered on the one or more baffles of the first layer, wherein the one or more baffles of the second layer are configured to undergo compression in response to the compression of the one or more baffles of the first layer, wherein pressure is increased in the one or more baffles as a result of restriction of air displacement and/or contents in the one or more baffles upon the compression of the one or more baffles and wherein increased pressure in the one or more baffles increases compression resistance of the one or more baffles causing the one or more baffles into contact the first layer and exert a force which decelerates said falling object.

In accordance with another example of the present disclosure, an impact absorbing device is disclosed for reducing a force exerted against a falling object upon impact of a falling object, the device comprising: a baffle configured to undergo compression in response to the impact of the falling object, wherein pressure is increased as a result of restriction of air displacement and/or contents in the baffle upon the compression of the baffle and wherein increased pressure in the baffle increases compression resistance of the baffle causing the baffle to exert a force which decelerates the falling object, and wherein the baffle includes one or more cells, each cell housing material configured to compress in response to compression of the impact of the object.

In accordance with another example of the present disclosure, a method is disclosed of decelerating a falling object by an impact absorbing device including a baffle with one or more cells configured to undergo compression in response to the impact of the falling object, each cell including a plurality of apertures, the method comprising: applying a first force on a first layer by a falling object; transferring the first force into a second layer by the first layer, wherein the second layer spreads the first force orthogonally to a direction of the first force; transferring the first force to a third layer by the second layer, thereby distributing the first force over a wider of the third layer than the second layer; compacting the third layer in response to the first force transferred, thereby expelling air out of the one or more cells by pressure and creating a second force created by air expulsion; transferring the second force to the first layer and object impacting the first layer; and reducing the velocity of the object in response to the second force.

DETAILED DESCRIPTION OF THE INVENTION

Figure 1:
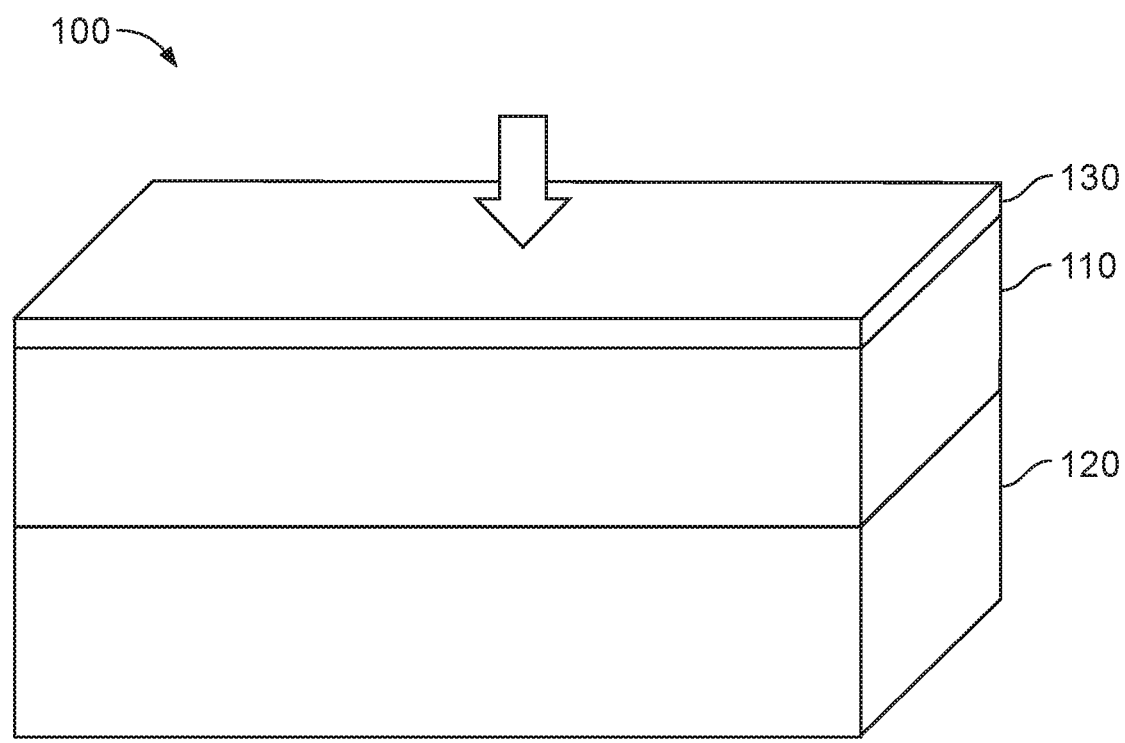
FIG. 1 illustrates a perspective view of an example impact absorbing mat.

FIG. 1 illustrates a perspective view of an example impact absorbing mat 100. The impact absorbing mat 100 is a form of an impact absorbing device. Impact absorbing devices are configured to reduce the force exerted against a falling object upon impact. An object may be any item or thing such as a gym weight or a body or body part (e.g., human, animal or other) as known to those skilled in the art. The impact absorbing mat 100 includes a damper layer 110, a linear layer 120 and a top layer 130. The downward arrow shown represents a downward force exerted by a falling object. In FIG. 1, the layers are shown as horizontal layers when the impact absorbing mat 100 is positioned on a surface. However, these layers may be configured as vertical in other examples and configurations as known to those skilled in the art.

The damper layer 110 is positioned, i.e., sandwiched between the top layer 130 and the linear layer 120. The damper layer 110 is in substantial contact with the top layer 130 and the linear layer 120. The damper layer 110 is described below in further detail with respect to FIG. 2 and FIG. 3. The linear layer 120 is described below in further detail with respect to FIG. 4 and FIG. 5. The top layer 130 is described below with respect to FIG. 6.

In operation, a falling object such as a gym weight exerts a downward force on the top layer 130. A percentage or portion of the energy from the downward force is used to compress the top layer 130. A percentage or portion of the remaining force presses or pushes the top layer 130 down into the damper layer 110, distributing and transferring energy to the damper layer 110. A portion of the energy transferred from the top layer 130 to the damper layer 110 is used to compress the damper layer 110. The compression resistance of the damper layer 110 is related to the velocity of the falling object exerting the downward force on to the damper layer 110. A portion of the remaining energy pushes the damper layer 110 down into the linear layer 120, transferring energy from the damper layer 110 to the linear layer 120. A portion of the energy transferred from the damper layer 110 to the linear layer 120 is used to compress the linear layer 120. The compression resistance of the linear layer 120 is related to the depth of compression of the linear layer 120 from the downward force.

The shape of the impact absorbing mat 100 disclosed herein may be any three-dimensional shape as known to those skilled in the art including, for example, triangular prism, hexagonal block, cuboid, tetrahedron, cone, and cylinder. The impact absorbing mat 100 may be of any length, width and/or depth. Further, the impact absorbing mat 100 may be any volume. For example, a volume of 2 cubic feet to 1000 cubic feet may be used.

In other examples of the impact absorbing mat, the linear layer 120 may be excluded from the impact absorbing mat 100 or the damper layer 110 may excluded from the impact absorbing mat 100 and the linear layer 110 is in substantially contact with the top layer 130. Alternatively, the linear layer 120 and the damper layer 110 of the impact absorbing mat 100 may be switched so the linear layer 120 is positioned between the top layer 130 and the damper layer 110. The impact absorbing mat 100 may include 2 to 5 linear layers 120. In one example, the impact absorbing mat 100 includes 2 to 3 linear layers 120. In another example, the impact absorbing mat 100 includes 4 to 5 linear layers 120. In examples of the impact absorbing mat with more than one linear layer 120, the linear layers 120 may or may not be in contact with another linear layer 120. In one example, the impact absorbing mat 100 may include 2 to 5 damper layers 110. The damper layers 110 may or may not be in contact with another damper layer 110. In one example, the impact absorbing mat 100 includes more than one damper layer 110 and more than one linear layer 120. The damper layers 110 and the linear layers 120 may be configured in series or in parallel.

In one example of the impact absorbing mat, the damper layer 110 is combined with the linear layer 120 within the same layer. In this respect, the makeup of the materials inside the baffles of the damper layer 110 and the makeup of the materials inside the baffles of the linear layer 120 are combined within one baffle.

Figure 2:
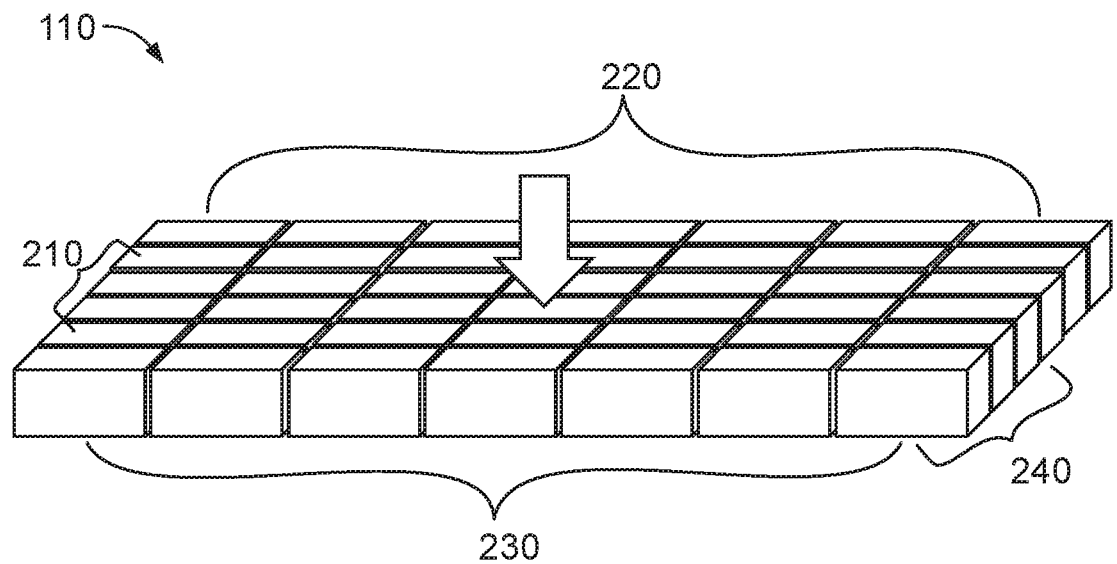
FIG. 2 illustrates a perspective view of an example damper layer of the impact absorbing mat in FIG. 1.

Now, FIG. 2 illustrates a perspective view of a damper layer 110 of the impact absorbing mat 100 in FIG. 1. The damper layer 110 includes damper baffles 210, a damper layer top surface 220, a damper layer bottom surface 230, and a damper layer perimeter surface 240. The damper baffles 210 are described in further detail in the description of FIG. 3. The bold downward arrow shown represents a downward force exerted by a falling object. The damper baffles 210 are arranged to form the damper layer (110) top surface 220, the damper layer bottom surface 230, and the damper layer perimeter surface 240 of the damper layer 110. The horizontal surfaces of the damper layer 110 include the damper layer top surface 220 and the damper layer bottom surface 230. The vertical surfaces defining the outer edges of the damper layer 110 include the damper layer perimeter surface 240. The damper layer top surface 220 is in contact with the top layer 130, and the damper layer bottom surface 230 is in contact with the linear layer 120 as shown in FIG. 1.

In operation, a falling object exerts a downward force on the damper layer 110. The damper baffles 210 are compressed by the downward force. The damper baffles 210 resist compression, exerting a counter-force against the falling object. The magnitude of counter-force exerted by the damper baffles 210 is related to the velocity at which the object exerting the downward force is falling. The force exerted by the damper baffle 210 decelerates the falling object, while the compression of the damper baffle 210 extends the distance and period of time over which the deceleration takes place. This reduced rate of deceleration results in a smaller average force being exerted against the falling object. When the downward force is removed the damper baffles 210 expand back to substantially their original shape. The damper baffles 210 and internal operation are described below in further detail in the description of FIG. 3.

Figure 11:
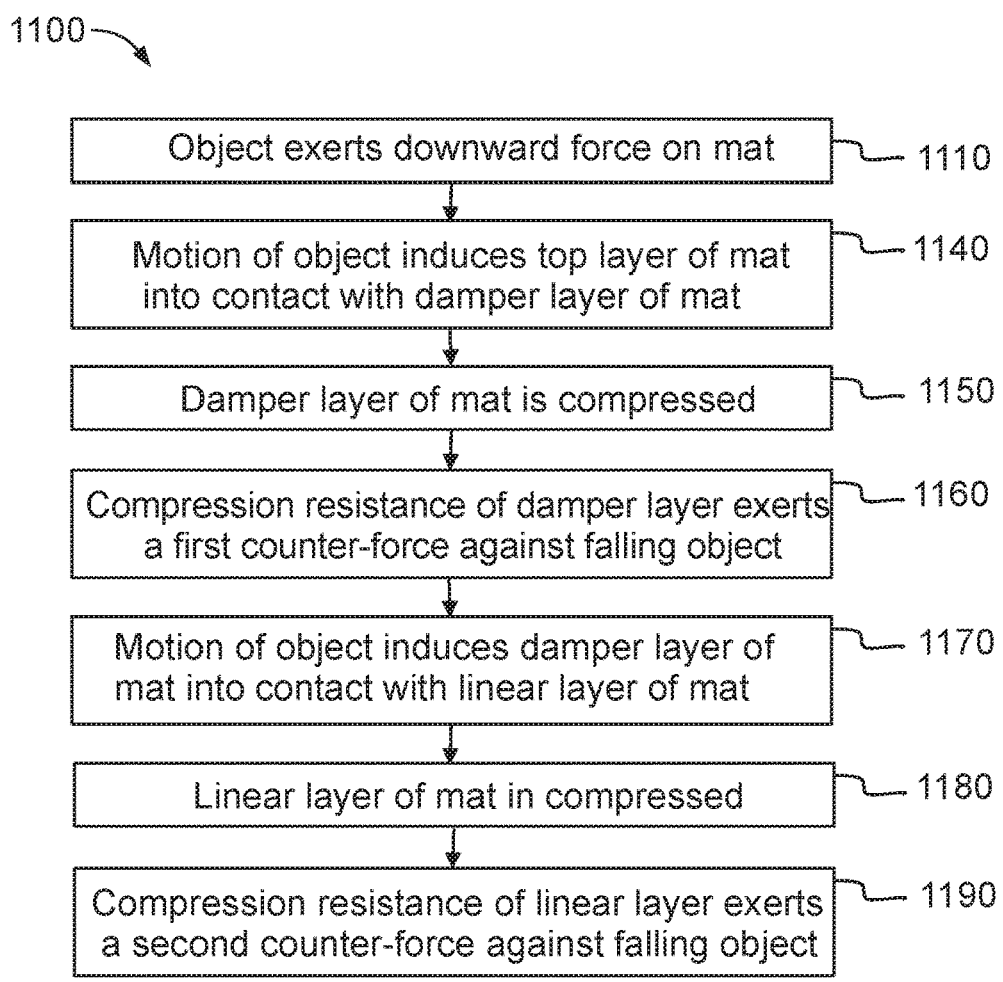
FIG. 11 illustrates a flowchart of example process steps of the operation of the impact absorbing mat of FIG. 1 upon impact of an object.

The damper baffles 210 may be any number of actual baffles as known to those skilled in the art to achieve desired results. In the example depicted in FIG. 2, the damper layer 110 includes forty two damper baffles 210. The distance separating the damper baffles 210 from adjacent damper baffles 210 (damper baffle separation) may be any distance in accordance with the number and composition of the baffles to achieve desired results as known to those skilled in the art. The damper baffles are configured in the shape of rectangular blocks and are arranged in a grid pattern to form rectangular block-shaped damper layer 110. However, the baffles may have any shape as known to those skilled in the art to achieve desired results. For example, damper baffles 201 may be shaped as a cylinder as shown in FIG. 11. Other examples, include triangular prims, hexagonal blocks, cuboid, sphere, tetrahedron and cone. The damper baffles may have any volume to achieve desired results. For example each baffle may have a volume of 0.25 feet$^3$ to 25 feet$^3$. The damper layer 110 is a single damper baffle 210. However, damper layer 110 may include any number of stacked layers of damper baffles 210.

Figure 3:
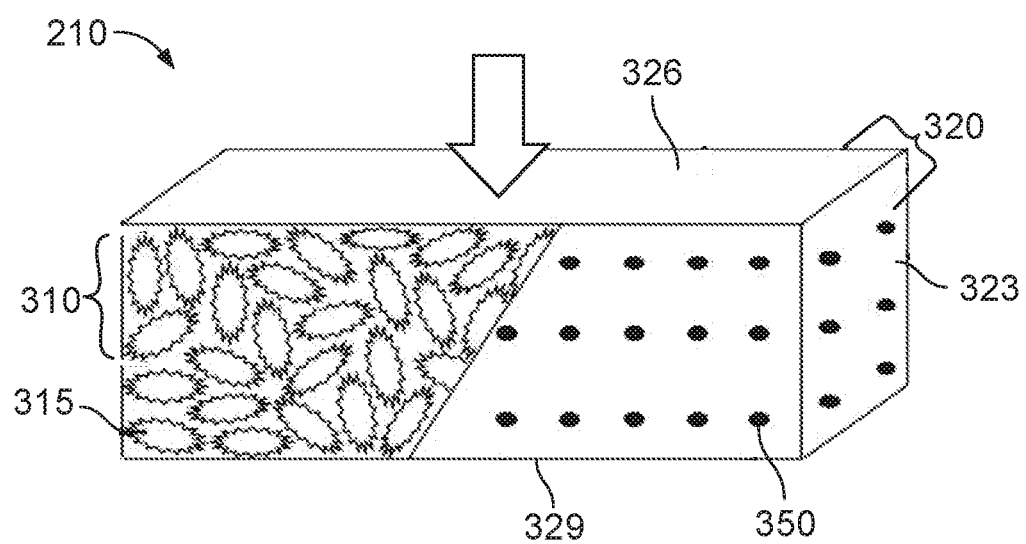
FIG. 3 illustrates a perspective view of an example damper baffle of the of the impact absorbing mat in FIG. 1.

FIG. 3 illustrates a perspective view of a damper baffle 210 of the damper layer 110 of the impact absorber mat 100 in FIG. 1. FIG. 3 excludes a portion of the front surface of the damper baffle 210 to expose (show) the inside of the damper baffle 210. The damper baffle 210 includes a damper baffle compression resistance system 310, a damper baffle casing 320 and a plurality of damper baffle air outlet/inlets 350. The damper baffle casing 320 includes a damper baffle ceiling 326, a damper baffle floor 329, and a damper baffle side wall 323. The damper baffle compression resistance system 310 includes sheeting 315. The sheeting 315 includes a number of small apertures (holes) to enable air to pass through sheeting 315 upon impact. The sheeting 315 is arranged inside the damper baffle 210 to form a plurality of cells (or bags or cavities of air (i.e., air-filled cells). Sheeting 315 may thus also be referred to as cells 315. The cells 315 are configured as bags that will crumple or compress under pressure. Sheeting 315 may be made of a single sheet folded or two or more sheets that create the cells as described in more detail below. The bold downward arrow represents a downward force exerted by a falling object. The damper baffle 210 includes air inlet/outlets 350 that extend through the damper baffle casing 320. In this example, the sheeting 315 is made of plastic but it can be made of any material known to those skilled in the art configured to bend or move in response to force.

In the example depicted, the cells 315 are crumpled and balled. The crumpling of the cells 315 forms a large number of creases in a variety of directions in the sheeting 315. The creases in the cells 315 create a complex geometry with a large number of surfaces (crumple surfaces) oriented in a variety of directions. Some of the crumple surfaces are in contact with other crumple surfaces. The crumpled sheeting 315 is packed into the damper baffle casing 320 within the damper baffle 210. The pressure may be 1 psi or any pressure known to those skilled in the art.

In operation, a falling object exerts a downward force on the damper baffle 210. The damper baffle 210 is compressed as the downward force deforms the damper baffle casing 320 and compacts the cells 315. The bending stiffness of the damper baffle casing 320 causes the damper baffle casing 320 to resist deformation, exerting a force against the downward force. The term bending stiffness refers to the resistance of a material against bending deformation. Air is displaced from the damper baffle 210 through the damper baffle air outlet/inlets 350 as the volume of the damper baffle 210 is reduced from compression. The rate at which air flows through the air outlet-inlets 350 is limited. The velocity of air being displaced is proportional to the speed of the falling object. As the speed changes, so does the force. Thus, the increased pressure inside the damper baffle 210 increases the compression resistance of the damper baffle 210, causing the damper baffle 210 to exert a force, i.e., a counter-force against the falling object.

In more detail, just after the object exerting the downward force impacts the mat, the downward force on the damper baffle 210 is at a maximum, resulting in an initial rapid compression of the damper baffle 210 and compaction of the crumpled sheeting or cells 315. The air in the air-filled cells is either trapped or restricted from being freely displaced from the air-filled cells upon compression of the damper baffle 210. The apertures in the cells 315 are of a size that restrict the rate that air moves through the apertures and out of the air-filled cells formed by the plastic sheeting 315. The restricted air displacement results in a smaller volume of air being displaced over time from the air-filled cells than the reduction in volume over time to the air-filled cells from compression, causing the pressure inside the air-filled cells to increase. This increased pressure in the air-filled cells increases the compression resistance of the air-filled cells, and the damper baffle 210 as a whole. The increased compression resistance of the damper baffle 210 exerts an increased counter-force against the falling object. The counter-force exerted by the damper baffle 210 pushes against the falling object exerting the downward force, decelerating the falling object and reducing the downward force.

An object falling at a greater velocity results in a faster initial compression of the damper baffle 210 and the air-filled cells formed by the sheeting 315 than an object falling at a lower velocity. The more rapidly the air-filled cells are compressed, the more the volume reduction to the air-filled cells will also compress. Therefore, compared to an object falling at a lower velocity, an object falling at a greater velocity results in higher pressure inside the air-filled cells. The increased pressure in the air-filled cells increases the compression resistance of the air-filled cells, and the damper baffle 210 as a whole. The increased compression resistance of the damper baffle 210 results in a larger counter-force being exerted by the damper baffle 210 against the falling object. The compression resistance of the damper baffle 210 being dependent of the velocity of the falling object allows the damper baffle 210 to exert enough force to substantially decelerate an object falling at a high velocity while still being compressible by an object falling at a lower velocity.

As the downward force dissipates with time following the moment of impact, air continues to be displaced from the air-filled cells and the damper baffle 210, reducing the pressure in the air-filled cells and the damper baffle 210. This reduction in pressure results in a decreasing counter-force exerted by the damper baffle 210 against the falling object. This reduced counter-force exerted by the damper baffle 210 continues to push against the falling object, further decelerating the falling object until either the damper baffle 210 is fully compressed or the magnitude of the force exerted by the damper baffle 210 meets or exceeds the magnitude of the downward force, ceasing the downward motion of the falling object. The compression of the damper baffle 210 extends the distance and period of time over which the deceleration of the falling object takes place. This reduced deceleration rate results in less force being exerted against the falling object.

When the downward force is removed, the elasticity of the cells 315 cause the compacted sheeting 315 to expand and push the damper baffle casing 320 outward, expanding the damper baffle 210 to substantially its original shape. Expansion of the damper baffle 210 results in negative pressure inside the damper baffle 210, causing air to be drawn into the damper baffle 210 through the damper baffle air outlet/inlet 350.

Compression resistance of the damper baffle 210 may be tuned in a variety of ways. First, tuning maybe achieved through adjusting the packing pressure of the sheeting 315 inside the damper baffle 210. The term packing pressure refers to the internal pressure in a container caused by packing a material into the container. Increasing the packing pressure of the plastic sheeting 315 increases the compression resistance of the damper baffle 210. Decreasing the packing pressure of the sheeting 315 decreases the compression resistance of the damper baffle 210. The packing pressure of the sheeting 315 in the damper baffle 210, for example maybe between 0 psi to 5 psi but could be designed to be any pressure to achieve desired results.

Second, compression resistance of the damper baffle 210 may be tuned through the thickness of the sheeting 315. Increasing the thickness of the sheeting 315 increases bending stiffness, and thus increases the compression resistance of the damper baffle 210. Decreasing the thickness of the sheeting 315 decreases bending stiffness, and thus decreases the compression resistance of the damper baffle 210. In addition, the sheeting 315 may be have a variety of thicknesses. For example, sheeting 315 may have a thickness of 0.05 millimeters to 1.5 millimeters. However, the thickness may be of any measurement as known to those skilled in the art to achieve desired results.

Third, compression resistance of the damper baffle 210 may be tuned through using sheeting 315 with differing bending stiffness. A material with a lower bending stiffness will deform under a lower magnitude of pressure than a material with a higher bending stiffness. Increasing the bending stiffness of the sheeting 315 increases the compression resistance of the damper baffle 210. Decreasing the bending stiffness of the sheeting 315 decreases the compression resistance of the damper baffle 210. In yet another example (fourth), compression resistance of the damper baffle 210 may be tuned through the selection of the type of material of the sheeting 315. The sheeting 315 may be of a material that is easy to manufacture (or having a low compression resistance, i.e., Young's modulus). If the sheeting is made of plastic(s), examples of the materials include commodity and engineering thermoplastics and thermosets such as polyethylene, polyurethane, polyvinyl, polypropylene, polycarbonate and polystyrene. In yet another example, (fifth), compression resistance of the damper baffle 210 may be tuned through the air permeability of the sheeting 315. Increasing the air permeability of the sheeting 315 decreases the compression resistance of the damper baffle 210. Decreasing the air permeability of the plastic sheeting 315 increases the compression resistance of the damper baffle 210. In yet another example (sixth), compression resistance of the damper baffle 210 is tuned by including apertures in the plastic sheeting 315. The addition of apertures to the plastic sheeting 315 increases the air permeability of the plastic sheeting 315 and decreases the compression resistance of the damper baffle 210.

In yet another example, compression resistance of the damper baffle 210 is tuned through the air permeability of the material comprising the damper baffle casing 320. Increasing the air permeability of the damper baffle casing 320 decreases the compression resistance of the damper baffle 210. Decreasing the air permeability of the damper baffle casing 320 increases the compression resistance of the damper baffle 210. In yet another example, compression resistance of the damper baffle 210 is tuned through the bending stiffness of the material comprising the damper baffle casing 320. For the damper baffle 210 to compress, the damper baffle casing 320 deforms. Increasing the bending stiffness of the damper baffle casing 320 increases the deformation resistance of the damper baffle casing 320 and thus increases the compression resistance of the damper baffle 210. Decreasing the bending stiffness of the damper baffle casing 320 decreases the compression resistance of the damper baffle 210.

In the example described above with respect to the baffles 210, the cells 315 includes apertures. The size of the apertures may between may have a diameter of 0.1 millimeters to 30 millimeters. However, the size of the apertures may be varied to achieve desired results. In addition, sheeting 315 need not include apertures. The number of apertures may also vary to achieve desired results. Examples include 1 to 10000 apertures per square foot. The damper baffles 210 are packed with sheeting 315 having varying levels of air permeability.

In the example described above, the sheeting or cells 315 are plastic bags.

Examples of the damper baffle casing 320 construction includes synthetic textile, natural textile, plastic, foam, epoxy, mesh, plastic sheets, and paper. The damper baffle ceiling 326, the damper baffle floor 329, and the damper baffle side wall 323 may be made of the same or different materials. In on example, the damper baffle casing 320 includes a breathable textile which functions as the damper baffle air inlet/outlet 350. The damper baffle air inlet/outlet 350 includes one or more apertures in the damper baffle casing 320. In one example, the damper baffle air inlet/outlet 350 includes one or more valves connected to the damper baffle casing 320.

In one example, a continuous piece of material may be used for the damper baffle ceiling 326 of multiple damper baffles 210. In another example, a continuous piece of material may be used for the damper baffle ceiling 326 of all of the damper baffles 210 in the damper layer 110. In another example, a continuous piece of material may be used for the damper baffle floor 329 of multiple damper baffles 210. A continuous piece of material comprises the damper baffle floor 329 of all of the damper baffles 210 in the damper layer 110.

The shape of the damper baffle 210 may be any three-dimensional shape. For example, the shape of the damper baffle 210 may be triangular prism, hexagonal block, cuboid, sphere, tetrahedron, cone, and cylinder.

In one example, the elasticity of the damper baffle casing 320 is sufficient to restore the damper baffle 210 to its original shape when the downward force is removed. In another example, the damper baffle 210 includes an internal structure. The flexible internal structure resists compression and provides sufficient elasticity to return the damper baffle 210 to its original shape when the downward force is removed.

Figure 4:
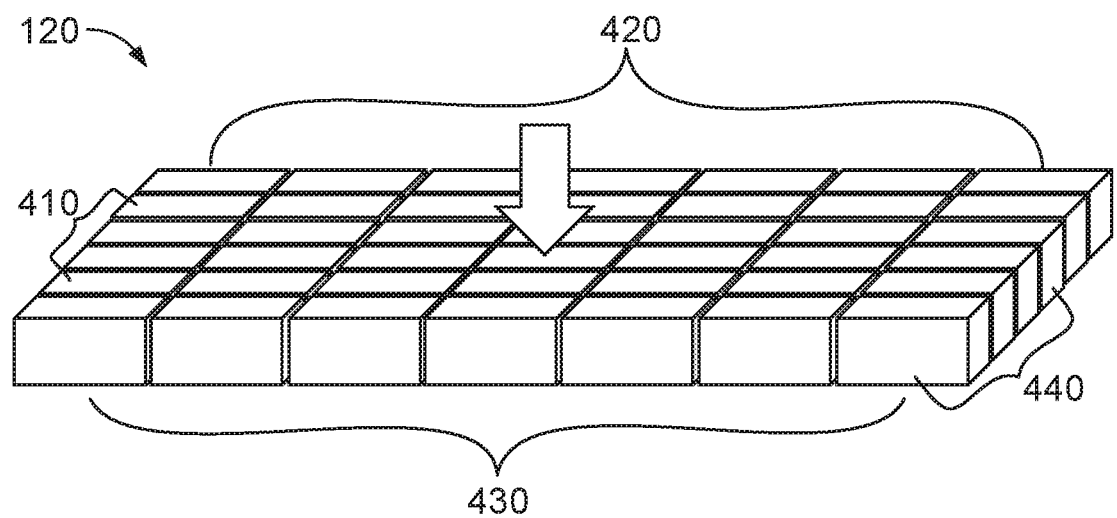
FIG. 4 illustrates a perspective view of an example linear layer of the impact absorbing mat in FIG. 1.

FIG. 4 illustrates a perspective view of a linear layer 120 of the impact absorbing mat 100 in FIG. 1. The linear layer 120 includes a plurality of linear baffles 410, a linear layer top surface 420, a linear layer bottom surface 430, and a linear layer perimeter surface 440. The linear baffles 410 are described in further detail in the description of FIG. 5. The bold downward arrow shown represents a downward force exerted by a falling object.

The plurality of linear baffles 410 are arranged to form the linear layer top surface 420, the linear layer bottom surface 430, and the linear layer perimeter surface 440 of the linear layer 120. The horizontal surfaces of the linear layer 120 are comprised of the linear layer top surface 420 and the linear layer bottom surface 430. The vertical surfaces defining the outer edges of the linear layer 120 include the linear layer perimeter surface 440. In the example depicted, the linear layer 120 includes forty two linear baffles 410. The distance separating the linear baffles 410 from adjacent linear baffles 410 (linear baffle separation) is about 1 inch. However, any number of baffles 410 with a specified separation may be used as known to those skilled in the art to achieve desired results. The linear baffles 410 are roughly in the shape of rectangular blocks and are arranged in a grid pattern to form a rectangular block-shaped linear layer 120. However, baffles 410 may have any shape and arrangement to achieve desired results. As discussed above in the description of FIG. 1, the damper layer 110 is positioned above and rests on top of the linear layer 120 in this example.

In operation, a falling object exerts a downward force on the linear layer 120. The downward force compresses the linear baffles 410. The linear baffles 410 resists compression, exerting a force back against the downward force. The more the linear baffle 410 is compressed, the greater the counter-force exerted by the linear baffle 410 against the falling object. The counter-force exerted by the linear baffle 410 decelerates the falling object, while the compression of the linear baffle 410 extends the distance and period of time over which the deceleration takes place. This reduced rate of deceleration results in less force being exerted against the falling object. When the downward force is removed, the linear baffles 410 expand back to their original shape. The linear baffles 410 are described in further detail in the description of FIG. 5.

Figure 12:
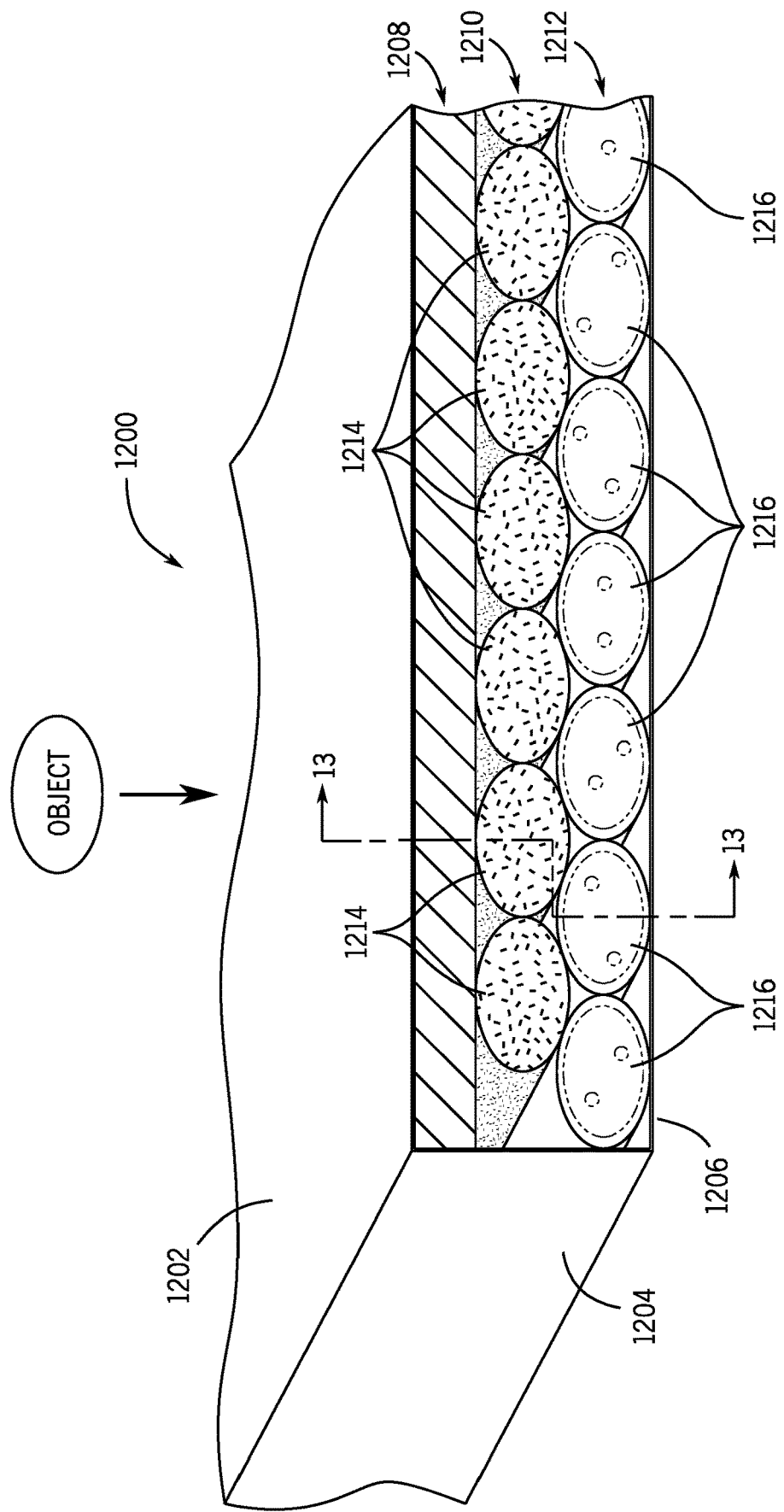
FIG. 12 illustrates a perspective view of another example impact absorbing mat.

The shape of the linear baffles 410 may be any number of baffles and may be any three-dimensional shape. For example, the shape of the linear baffles 410 may be a triangular prism, hexagonal block, cuboid, sphere, tetrahedron, cone and cylinder as shown in FIG. 12 and described below. The linear baffles 410 may be in contact with each other or separated. In one example, the shape of the linear layer top surface 420 and the linear layer bottom surface 430 of the linear layer 120 may be oval, circle, square, rectangle, triangle, pentagon, hexagon, heptagon, octagon, nonagon, and dodecagon. The linear layer 120 includes a single linear baffle 410, but layer 120 may include two or more stacked layers baffles 410.

Figure 5:
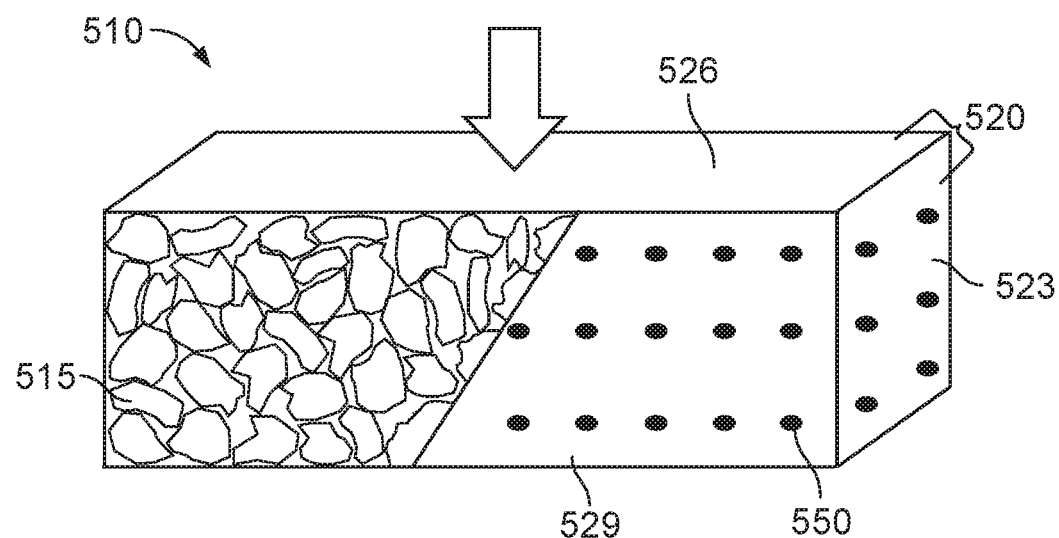
FIG. 5 illustrates a perspective view of an example linear baffle of the impact absorbing mat in FIG. 1.

FIG. 5 illustrates a perspective view of a linear baffle 410 according to an embodiment of the present disclosure. FIG. 5 excludes a portion of the front surface of the linear baffle 410 to expose (show) the inside of the linear baffle 410. The linear baffle 410 includes a linear compression resistance system 510, a linear baffle casing 520 (comprised of a synthetic textile or other material known to those skilled in the art), and linear baffle air outlet/inlets 550. The linear compression resistance system 510 includes a linear filling material 515. In this example, the linear filling material 515 includes irregularly shaped three-dimensional pieces of expanded polystyrene foam. The pieces of expanded polystyrene foam may be of any size to achieve desired results For example, the foam may be between about 0.1 and 0.5 inches wide in each direction. The linear baffle casing 520 includes a linear baffle ceiling 526, a linear baffle floor 529, and a linear baffle side wall 523. The bold downward arrow shown represents a downward force exerted by a falling object.

The linear baffle side wall 523 defines the vertical surfaces of the linear baffle 410, and the linear baffle ceiling 526 and the linear baffle floor 529 define the horizontal surfaces of the linear baffle 410 to form a container. In this example, the linear baffle casing 520 is arranged to form a rectangular block shaped linear baffle 410. The linear baffle air inlet/outlet 550 is connected to the linear baffle casing 520. The linear filling material 515 is packed into the linear baffle casing 520 to any pressure to achieve desired pressure. For example, linear baffle 410 may have a pressure of about 2 psi.

In operation, a falling object exerts a downward force on the linear baffle 410. The linear baffle casing 520 deforms and the linear filling material 515 is compressed in the direction of the downward force. The reduction in volume to the linear baffle 410 cause the air in the linear baffle 410 to be displaced through the linear baffle air outlet/inlets 550. The bending stiffness of the linear baffle casing 520 causes the linear baffle casing 520 to resist deformation, exerting a counter force against the falling object. The linear filling material 515 also resists compression, also exerting a counter-force against the falling object.

Consistent with the Poisson effect, compression of the linear filling material 515 in the direction of the downward force causes the linear filling material 515 to expand in the two axes perpendicular to the downward force. The expansion of the linear filling material 515 in the two axes perpendicular to the downward force exerts a force outward against other linear filling material 515 of the linear baffle 410 in the two axes perpendicular to the downward force. The force exerted against the other linear filling material 515 in the two axes perpendicular to the downward force compress the other linear filling material 515, and also pushes the other linear filling material 515 into the linear baffle side wall 523. The other linear filling material 515 resists compression, exerting a force back inward against the expansion of the linear filling material 515 in the two axes perpendicular to the downward force. The bending stiffness of the material comprising the linear baffle side wall 523 and the tension in the linear baffle side wall 523 from the linear baffle side wall 523 being attached to the linear baffle ceiling 526 and the linear baffle floor 529 cause the linear baffle side wall 523 to resist deformation. The deformation resistance of the linear baffle side wall 523 causes the linear baffle side wall 523 to exert a force back inward against the expansion of the linear filling material 515 in the two axes perpendicular to the downward force. The inward forces exerted by the other linear filling material 515 and the linear baffle side wall 523 restrict compression of the linear filling material 515 in the direction of the downward force. The restricted compression of the linear filling material 515 exerts an additional counter-force against falling object.

As the linear baffle 410 is compressed further, the linear filling material 515 expands further in the two axes perpendicular to the downward force. The further expansion of the linear filling material 515 in the two axes perpendicular to the downward force exerts additional force outward against the linear baffle side wall 523, and other linear filling material 515 of the linear baffle 410, in the two axes perpendicular to the downward force. The bending stiffness of the linear baffle side wall 523 causes the linear baffle side wall 523 to continue resisting deformation, and the other linear filling material 515 continue to resist compression, exerting additional force back inward against the expansion of the linear filling material 515 in the two axes perpendicular to the downward force. The additional inward force exerted by the linear baffle side wall 523 further restricts compression of the linear filling material 515 in the direction of the downward force. The further restricted compression of the linear filling material 515 causes the linear filling material 515 to exert an increased counter-force against falling object.

The more the linear baffle 410 is compressed in the direction of the downward force, the more force the linear baffle 410 exerts back against the downward force. The compression-depth-dependent compression resistance of the linear baffle 410 results in the falling object being more rapidly decelerated as the linear baffle 410 becomes more compressed. The falling object is initially decelerated at a slower rate, minimizing the force exerted on the falling object. As the downward force of the falling object further compresses the linear baffles 410, the falling object is decelerated at a faster rate, resulting in a greater force being exerted against the falling object, but preventing the force of the falling object from completely compressing the linear baffle 410. Complete compression of the linear baffle 410 can result in a sudden deceleration of the falling object exerting the downward force, and a large amount of force being exerted against the falling object.

When the downward force is removed, the elastic properties of the linear filling material 515 and the linear baffle casing 520 cause the pieces of linear filling material 515 to return to substantially their original shape, returning the linear baffle casing 520 inward, expanding the linear baffle 410 to substantially its original shape. Expansion of the linear baffle 410 results in negative pressure inside the linear baffle 410, causing air to be drawn into the linear baffle 410 through the linear baffle air outlet/inlet 550.

In one example, compression resistance of the linear baffle 410 is tuned through adjusting the packing pressure of the linear filling material 515. Increasing the packing pressure of the linear filling material 515 increases the compression resistance of the linear baffle 410. Decreasing the packing pressure of the linear filling material 515 decreases the compression resistance of the linear baffle 410.

In one embodiment, the packing pressure of the linear filling material 515 in the linear baffle 410 is 0 psi to 5 psi but the packing pressure could be any number.

Linear baffle may be tuned to any compression as follows. For example, compression resistance of the linear baffle 410 is tuned through the compression resistance of the linear filling material 515. Increasing the compression resistance of the linear filling material 515 increases the compression resistance of the linear baffle 410. Decreasing the compression resistance of the linear filling material 515 decreases the compression resistance of the linear baffle 410.

For example, compression resistance of the linear baffle 410 is tuned through the selection of the type of material comprising the linear filling material 515. In yet another example, compression resistance of the linear baffle 410 is tuned through the Poisson ratio of the linear filling material 515. Increasing the Poisson ratio of the linear filling material 515 increases the compression resistance of the linear baffle 410. Decreasing the Poisson ratio of the linear filling material 515 decreases the compression resistance of the linear baffle 410.

The linear filling material 515 is a closed cell foam such as polyethylene foam, open cell foam such as polyurethane foam, and latex rubber foam, expanded polystyrene, polystyrene, polyvinyl, polypropylene, polycarbonate, shredded paper, shredded plant product, shredded plastic, shredded cloth or any other material known to those skilled in the art.

The shape of the pieces of linear filling material 515 may be any three-dimensional shape. For example, the shape of the pieces of linear filling material 515 may be triangular prism, hexagonal block, cuboid, sphere, tetrahedron, cone, irregular shapes and cylinder. In one example, the linear baffles 410 are packed with linear filling material 515 pieces having a variety of volumes. In another example, the linear filling material 515 includes multiple types of different material. The linear filling material 515 includes one type of material or may include many materials. The linear baffle casing 520 may include one or more materials such as synthetic textile, natural textile, plastic, foam, epoxy, mesh, and paper. The linear baffle ceiling 526, the linear baffle floor 529, and the linear baffle side wall 523 may be the same materials or different materials. The linear baffle casing 520 may include a breathable textile which functions as the linear baffle air inlet/outlet 550. Alternatively, the linear baffle air inlet/outlet 550 may be one or more apertures in the linear baffle casing 520 or one or more valves connected to the linear baffle casing 520. The valves communicate air between the inside of the linear baffle 410 and the outside environment.

In another example, compression resistance of the linear baffle 410 is tuned through the air permeability of the material comprising the linear baffle casing 520. Increasing the air permeability of the linear baffle casing 520 decreases the compression resistance of the linear baffle 410. Decreasing the air permeability of the linear baffle casing 520 increases the compression resistance of the linear baffle 410.

In another example, of linear baffle compression, compression resistance of the linear baffle 410 may be tuned through the bending stiffness of the material comprising the linear baffle casing 520. Increasing the bending stiffness of the linear baffle casing 520 increases the compression resistance of the linear baffle 410. Decreasing the bending stiffness of the linear baffle casing 520 decreases the compression resistance of the linear baffle 410. A continuous piece of material may be used for the linear baffle ceiling 526 of multiple linear baffles 410 . A continuous piece of material may be used for the linear baffle floor 529 of multiple linear baffles 410.

The linear baffle 410 may be configured to be any three-dimensional shape. For example, the shape of the linear baffle 410 is selected from a list including: triangular prism, hexagonal block, cuboid, sphere, tetrahedron, cone, and cylinder.

In one example, the elasticity of the linear baffle casing 520 is sufficient to restore the linear baffle 410 to its original shape when the downward force is removed.

In one example, the expansion of the linear baffles 410 in the two axes perpendicular to the downward force causes the linear baffles 410 to exert a force in the two axes perpendicular to the downward force against adjacent linear baffles 410 in the linear layer 120. This force further increases compression resistance of the adjacent linear baffles 410 and increases the compression resistance of the linear layer 120. In another example, the linear baffle 410 includes an internal structure that resists compression and provides sufficient elasticity to return the linear baffle 410 to its original shape when the downward force is removed. In another example, the baffles in linear layer 120 may be entirely hollow, housing only air. In this example, the linear baffle casing may be non-porous (i.e., the baffle encapsulates air).

Figure 6:
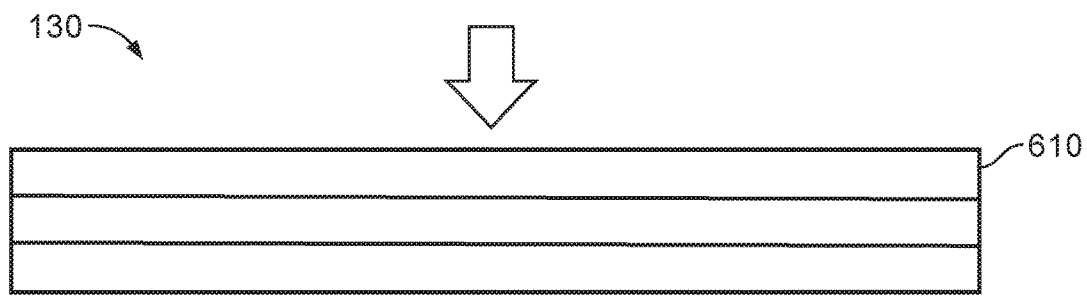
FIG. 6 illustrates a perspective view of an example top layer of the impact absorbing mat in FIG. 1.

FIG. 6 illustrates a perspective view of a top layer 130 according to an embodiment of the present disclosure. The top layer 130 includes a sheet of expanded polystyrene foam 610. The bold downward arrow represents a downward force exerted by a falling object.

In operation, a falling object exerts a downward force on the top layer 130. The sheet of expanded polystyrene foam 610 provides an even surface upon which the falling object makes impact. The sheet of expanded polystyrene foam 610 is relatively rigid, and thus distributes the downward force over a greater area. If the sheet of expanded polystyrene foam 610 is rigid enough, the downward force will be distributed over more than just the area compressed by the falling object on the top layer 130. The downward force is spread over multiple of the plurality of damper baffles 210 comprising the damper layer 110. The even surface provided by the sheet of expanded polystyrene foam 610 also makes the impact absorbing mat 100 easier to walk on. Top layer 130 may include any number of sheets of foam (e.g. 1, 2 or more).

The foam 610 may be closed cell foam such as polyethylene foam, open cell foam such as polyurethane foam or latex rubber foam, expanded, polystyrene, polyvinyl, polypropylene, and polycarbonate. In one example, the top layer 130 includes multiple sheets of foam 610 of one type or multiple types. In one example, the shape of the horizontal surfaces of the top layer 130 may include any two-dimensional shape such as oval, circle, square, rectangle, triangle, pentagon, hexagon, heptagon, octagon, nonagon, and dodecagon.

Figure 7:
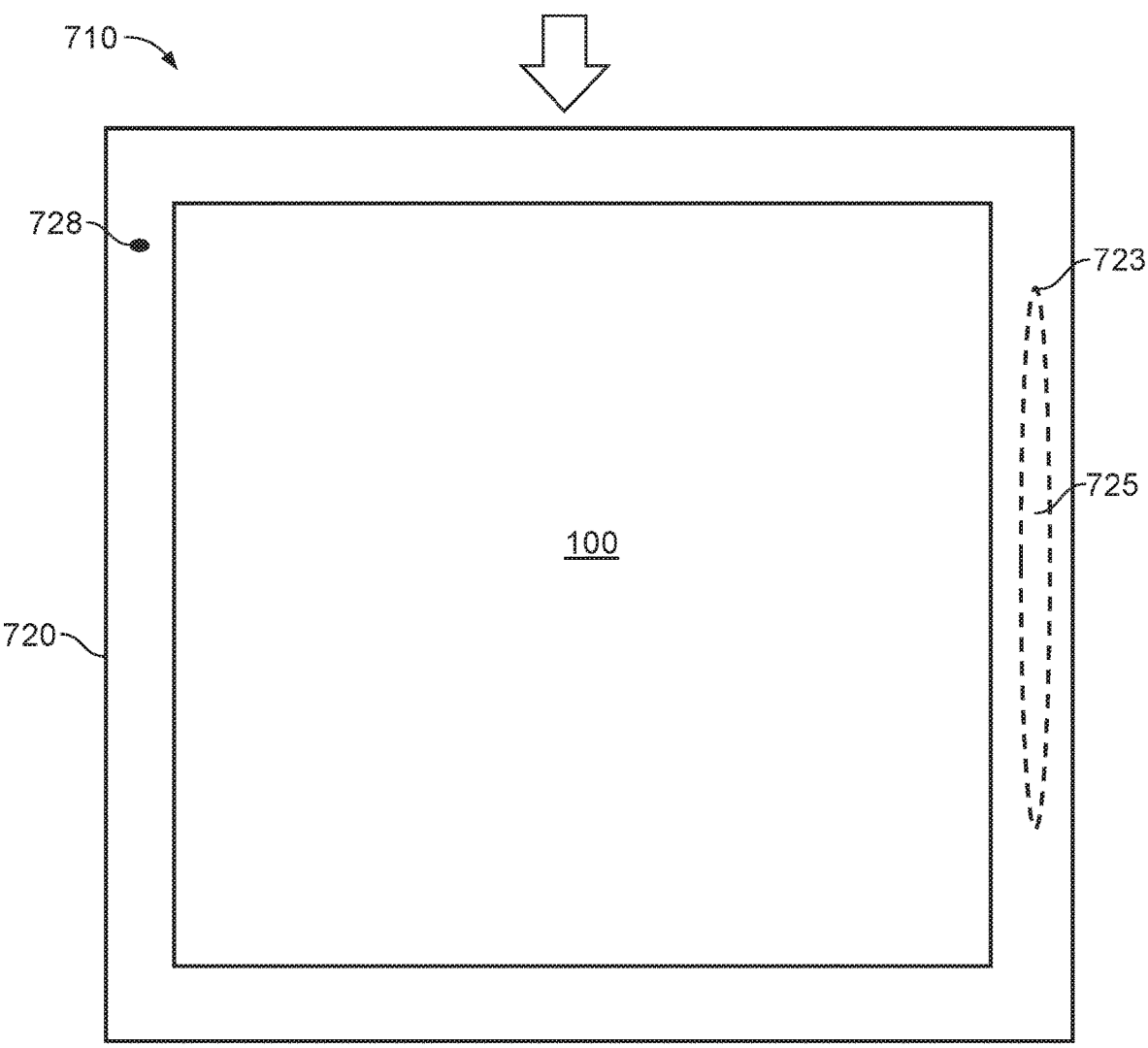
FIG. 7 illustrates a front view of the impact absorbing mat of FIG. 1 encased in an impact absorbing mat cover.

FIG. 7 illustrates a front view of the impact absorbing mat 100 encased in an impact absorbing mat cover 710. The impact absorbing mat cover 710 includes a mat cover material 720 with a zipper 723, a cover aperture 725 and a mat cover air outlet/inlet 728. The bold downward arrow shown represents a downward force exerted by a falling object.

The zipper 723 is fastened to the mat cover material 720. The zipper 723 defines the border of the cover aperture 725 in the mat cover material 720. The impact absorbing mat 100 is placed inside the impact absorbing mat cover 710 through the cover aperture 725. The zipper 723 closes to fully encase the impact absorbing mat 100 in the impact absorbing mat cover 710. The mat cover air outlet/inlet 728 is connected to the mat cover material 720.

In operation, a falling object impacts the impact absorbing mat cover 710. Most of the downward force exerted by the falling object is passed through the impact absorbing mat cover 710 and to the top layer 130 of the impact absorbing mat 100. Air is displaced through the mat cover air outlet/inlet 728 upon compression of the impact absorbing mat 100. The impact absorbing mat cover 710 protects the impact absorbing mat 100 from direct contact with the falling object and assists in keeping the impact absorbing mat 100 clean and protected from outside environmental conditions.

In one example, the mat cover material 720 is made of a material that has durable properties such as vinyl, synthetic textile, natural textile, plastic sheet, foam, epoxy, mesh, and paper. In another example, the zipper 723 is replaced with Velcro, clips, buttons, stitching and ties or any combination of these attachment mechanisms. The mat cover air outlet/inlet 728 may be a valve and/or an aperture. In an example mat cover, the mat cover material 720 includes an air permeable material which functions as the mat cover air outlet/inlet 728.

Figure 8:
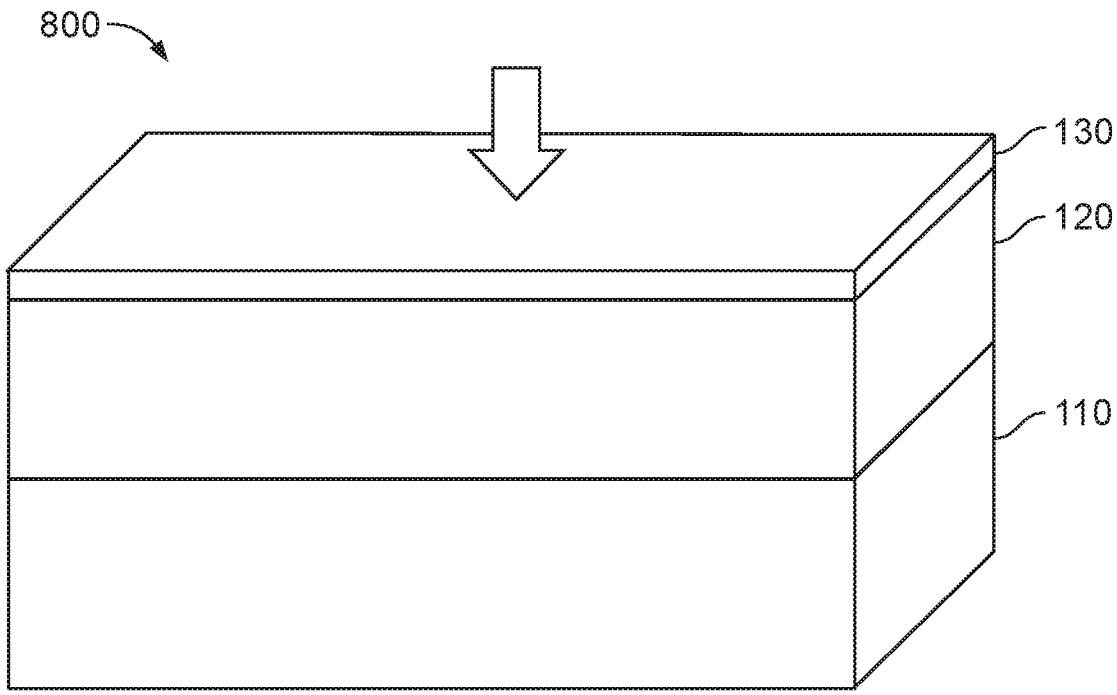
FIG. 8 illustrates a perspective view of another example (second) impact absorbing mat.

FIG. 8 illustrates a perspective view of another example (second) impact absorbing mat 800. The impact absorbing mat 800 includes a damper layer 110, a linear layer 120 and a top layer 130. The bold downward arrow shown represents a downward force exerted by a falling object.

The second impact absorbing mat 800 differs from the first impact absorbing mat 100 in that the positions of the damper layer 110 and the linear layer 120 are switched. The linear layer 120 is positioned between the top layer 130 and the damper layer 110 (bottom). The linear layer 120 is in substantial contact with the top layer 130 and the damper layer 110.

In operation, a falling object exerts a downward force on the top layer 130. A percentage or portion of the energy from the downward force is used to compress the top layer 130. The top layer 130 functions as described above in the description of FIG. 6. A percentage or portion of the remaining energy pushes the top layer 130 down into the linear layer 120, distributing and transferring energy to the linear layer 120. A percentage or portion of the energy transferred from the top layer 130 to the linear layer 120 is used to compress the linear layer 120. The compression resistance of the linear layer 120 is related to the depth of compression of the linear layer 120 from the downward force. The linear layer 120 functions as described above in the descriptions of FIG. 4 and FIG. 5. A percentage or portion of the remaining energy pushes the linear layer 120 down into the damper layer 110, transferring energy from the linear layer 120 to the damper layer 110. A portion of the energy transferred from the linear layer 120 to the damper layer 110 is used to compress the damper layer 110. The compression resistance of the damper layer 110 is related to the velocity of the falling object exerting the downward force on the damper layer 110. The damper layer 110 functions as described above in the descriptions of FIG. 2 and FIG. 3.

Figure 9:
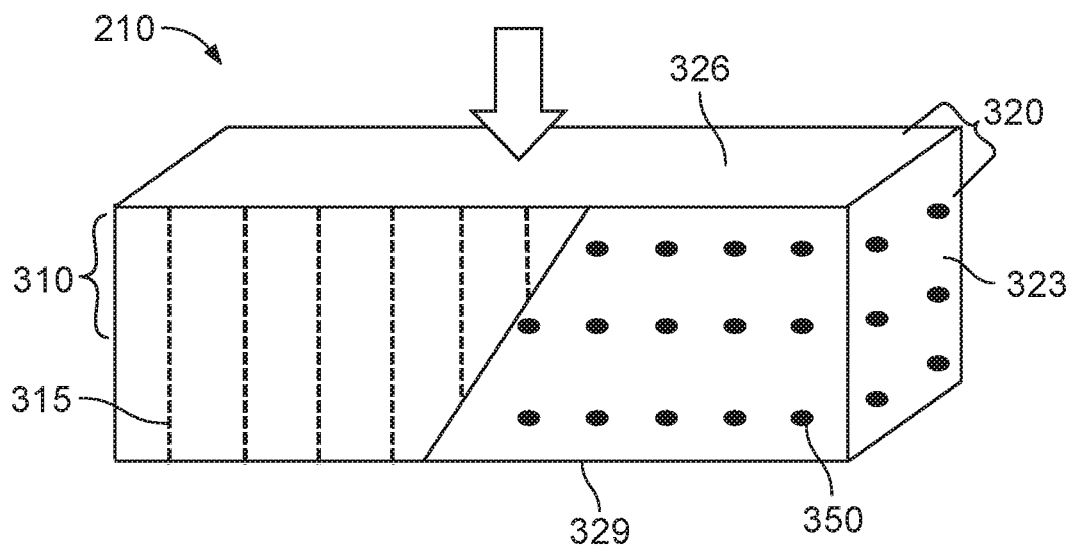
FIG. 9 illustrates another example damper baffle.

FIG. 9 illustrates another example of the damper baffle 210. This particular example differs from the example of the damper baffle 210 depicted in FIG. 3 in that the sheeting 315 of the damper baffle compression resistance system 310 is arranged differently to form the air-filled cells. The sheeting 315 contains apertures as described above with respect to the description of FIG. 3. In this example, the sheeting 315 includes several sheets made of plastic (or plastic sheeting). Each of the plastic sheets are connected to the damper baffle ceiling 326, the damper baffle floor 329, and two parallel surfaces of the damper baffle side wall 323. In this example, the air-filled cells are rectangular-block-shaped and are defined by the sheeting 315 and the damper baffle floor 329, damper baffle ceiling 326 and the damper baffle side wall 323.

In operation, this particular example, the damper baffle 210 differs from the example of the damper baffle 210 described above in FIG. 3 in that the sheeting 315 is not crumpled or packed into the damper baffle 210. The sheeting 315 does not cause the damper baffle 210 to expand and return to its original shape due to lack of packing pressure and elasticity of the sheeting 315. Instead, in this example, the damper baffle floor 329, damper baffle ceiling 326 and the damper baffle side wall 323 have sufficient elasticity for the damper baffle 210 to return to substantially its original shape when the downward force is removed.

In one example, the damper baffle 210 includes a semi-rigid internal structure that resists compression and provides sufficient elasticity to return the damper baffle 210 to its original shape when the downward force is removed. The sheeting 315 in this example is oriented horizontally. Each sheet is connected to each surface of the damper baffle side wall 323.

The damper baffle compression resistance system 310 may have any number of sheets for sheeting 315. Examples include 2 to 30 sheets. In one example, the damper baffle 210 includes linear filling material 515 inside the air-filled cells.

In one example, the packing pressure and elasticity of the linear filling material 515 in the damper baffle 210 cause the damper baffle 210 to expand and return to substantially its original shape when the downward force is removed. In another example, the damper baffle 210 includes crumpled sheeting 315 inside the air-filled cells.

In one example, the air-filled cells are configured as an envelope including the aperture-containing sheeting 315. The linear filling material 515 is included inside the air-filled cells formed by the sheeting 315. The air-filled cells are packed inside the damper baffle 210. The elasticity of the linear filling material 515 causes the linear filling material 515 to re-expand when the downward force is removed, causing the air-filled cells to self-inflate.

Figure 10:
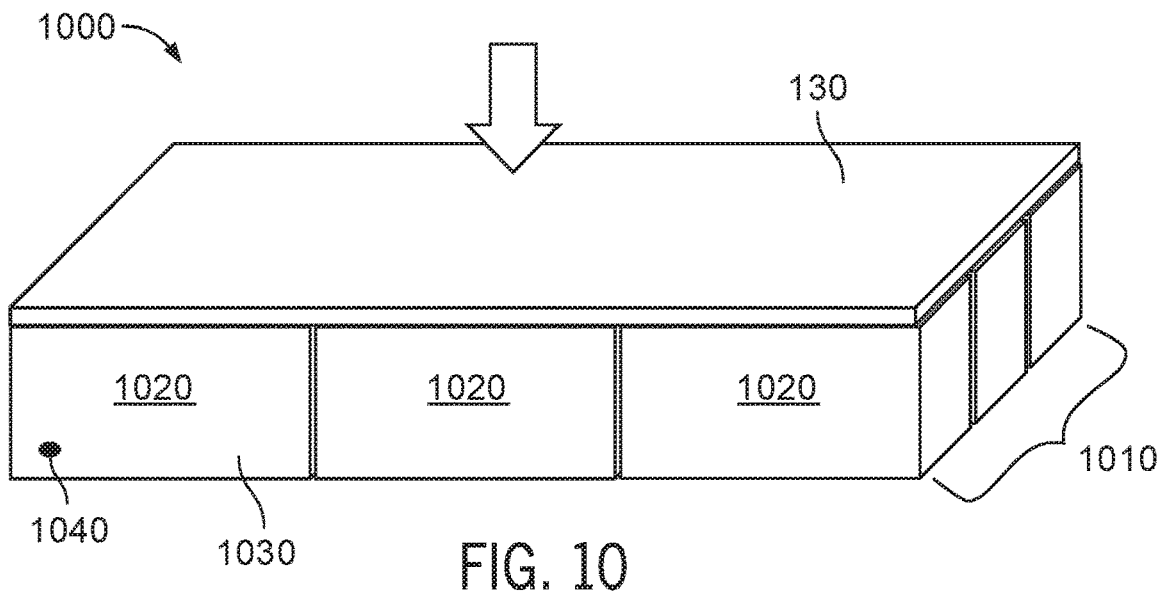
FIG. 10 illustrates another example (third) impact absorbing mat.

FIG. 10 illustrates another (third) impact absorbing mat. The impact absorbing mat 1000 includes a top layer 130 and a combined damper/linear layer 1010. The combined damper/linear layer 1010 includes damper/linear baffles 1020. The damper/linear baffles 1020 include a damper compression resistance system, a linear compression resistance system and a damper/linear baffle casing material 1030. The damper compression resistance system includes sheeting. The sheeting is a plastic sheeting. The linear compression resistance system includes a linear filling material. The damper/linear baffle casing material 1030 includes a damper/linear baffle air outlet/inlet 1040. The bold downward arrow shown represents a downward force exerted by a falling object.

The impact absorbing mat 1000 differs from the impact absorbing mat 100 in that the damper compression resistance system and the linear compression resistance system are both included in each of the damper/linear baffles 1020. The impact absorbing mat 100 includes one layer (the linear layer 120) with baffles containing the linear compression resistance system 510, and a separate layer (the damper layer 110) with baffles containing the damper compression resistance system 310.

The walls of the damper/linear baffles 1020 are defined by the damper/linear baffle casing material 1030 to form a container. The damper/linear baffle air outlet/inlet 1040 is connected to the damper/linear baffle casing material 1030. The crumpled sheeting and the linear filling material is packed inside each of the damper/linear baffles 1020. Adjacent damper/linear baffles 1020 of the damper/linear layer 1010 are distance (e.g., about 3 inches) from each other.

The damper/linear baffles 1020 are sized and arranged such that they combine to form a surface that has suitable dimensions for the top layer 130 to be stacked on top of the damper/linear layer 1010. In the example depicted the damper/linear baffle casing material 1030 is arranged so that the damper/linear baffles 1020 are roughly in the shape of rectangular blocks. In the example depicted, the damper/linear baffles 1020 are arranged in a grid pattern to form a roughly rectangular block-shaped damper/linear layer 1010.

In operation, a falling object exerts a downward force on the top layer 130. A percentage or portion of the energy from the downward force is used to compress the top layer 130. A percentage or portion of the remaining energy pushes the top layer 130 down into the damper/linear layer 1010, distributing and transferring energy to the damper/linear layer 1010. A percentage or portion of the energy transferred from the top layer 130 to the damper/linear layer 1010 is used to compress the damper/linear layer 1010.

The compression resistance of the damper/linear layer 1010 is related to the velocity of the falling object exerting the downward force on the damper/linear layer 1010 and the depth of compression of the damper/linear layer 1010 from the downward force. The damper/linear baffles 1020 are compressed as the downward force deforms the damper/linear baffle casing material 1030 and compresses the crumpled sheeting and the linear filling material. Air is displaced from the damper/linear baffle 1020 through the damper/linear baffle air outlet/inlet 1040 as the volume of the damper/linear baffle 1020 is reduced from compression. The damper/linear baffle casing material 1030, the crumpled sheeting and the linear filling material each resist compression/deformation, exerting a force against the downward force. Just after the falling object impacts the mat, the downward force on the damper/linear baffle 1020 will be at a maximum, resulting in an initial rapid compression of the damper/linear baffle 1020

The packed crumpled sheeting operates in the same way as the crumpled sheeting 315 described above in the description of FIG. 3. The linear filling material operates in the same way as the linear filling material 515 described above in the description of FIG. 5.

When the downward force is removed, the crumpled sheeting and the linear filling material expand and push the damper/linear baffle casing material 1030 outward, restoring the damper/linear baffle 1020 to substantially its original shape. Air is drawn into the damper/linear baffle 1020 through the damper/linear baffle air outlet/inlet 1040 as expansion of the damper/linear baffle 1020 results in negative pressure inside the damper/linear baffle 1020.

In one example, the damper/linear baffles 1020 are filled so that the crumpled sheeting is packed in a portion of the damper/linear baffles 1020 that is further from the top layer 130 than the linear filling material, and the linear filling material is packed in a portion of the damper/linear baffles 1020 closer to the top layer 130 than the crumpled sheeting.

In one embodiment, the damper/linear baffles 1020 are filled so that the linear filling material is packed in a portion of the damper/linear baffles 1020 that is further from the top layer 130 than the crumpled sheeting, and the crumpled sheeting 315 are packed in a portion of the damper/linear baffles 1020 closer to the top layer 130 than the linear filling material.

In one example, the damper/linear baffles 1020 are filled so that the linear filling material and crumpled sheeting are both distributed throughout the damper/linear baffle 1020. In one example, the ratio by volume of linear filling material to crumpled sheeting packed in the damper/linear baffles 1020 may be 1:4, 1:5, 1:6, 1:7, 1:8, 1:9, 1:10, 1:12, 1:14, 1:16, 1:18, 1:20, 1:30 or any ratio known to those skilled in the art to achieve desired results.

The packing pressure of the linear filling material and the crumpled sheeting inside the damper/linear baffles 1020 may be configured to be from 0 psi to 5 psi. However, any pressure may be used to achieve desired results as known to those skilled in the art.

FIG. 11 illustrates a flowchart 1100 of an example process for reducing the force exerted against a falling object upon impact by the impact absorbing mat 100 in FIG. 1. The process begins at step 1110 wherein the falling object impacts the top layer 130 of the impact absorbing mat 100, exerting a downward force on the top layer 130. Then, at step 1140, the downward force pushes the top layer 130 down into the damper layer 110, distributing and transferring energy to the damper layer 110. The top layer 130 is described in further detail above with respect to FIG. 6.

Next, at step 1150, a percentage or portion of the energy transferred from the top layer 130 to the damper layer 110 is used to compress the damper layer 110. Next, at step 1160, the damper layer 110 resists compression, exerting a first counter-force against the falling object. The first counter-force further decelerates the falling object. The damper layer 110 is described in further detail above in the descriptions of FIG. 2 and FIG. 3.

Next, at step 1170, a portion of the remaining energy pushes the damper layer 110 down into the linear layer 120, transferring energy from the damper layer 110 to the linear layer 120. Next, at step 1180, a portion of the energy transferred from the damper layer 110 to the linear layer 120 is used to compress the linear layer 120. Next, at step 1190, the linear layer 120 resists compression, exerting a second counter-force against the falling object. The second counter-force further decelerates the falling object. The linear layer 120 is discussed in further detail above with respect to FIG. 4 and FIG. 5.

As described above, the steps depicted in FIG. 11 apply to the impact absorbing mat 100 of FIG. 1. The process steps however also apply to the impact absorbing mat 800 of FIG. 8 (for example), but the layers shown in steps in steps 1140, 1150, 1160, 1170, 1180 and 1190 are switched. That is, in this in step 1140, the motion of an object induces the top layer of the mat into contact with the linear layer (instead of damper layer) of the mat. In step 1150, the linear layer of the mat is compressed. In step 1160, the compression resistance of linear layer exerts a first (counter) force against the falling object and the motion of the object induces the linear layer of the mat into contact with the damper layer of the mat at step 1170. At steps 1180 and 1190, the damper layer of the mat is compressed and the compression resistance of the damper layer exerts a second counter-force against the falling object.

Figure 13:
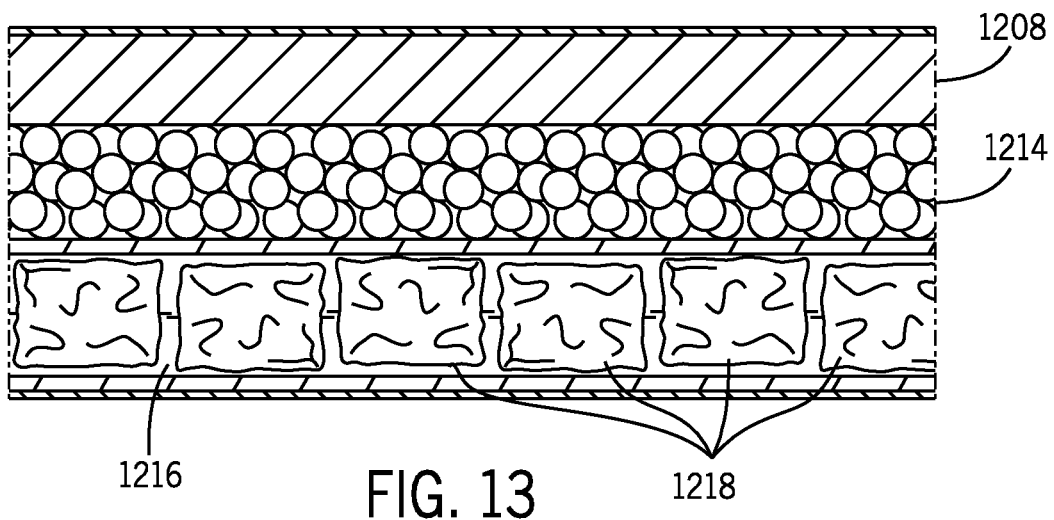
FIG. 13 illustrates a cross sectional view of the impact absorbing mat in FIG. 12 along line 13-13.
Figure 14:
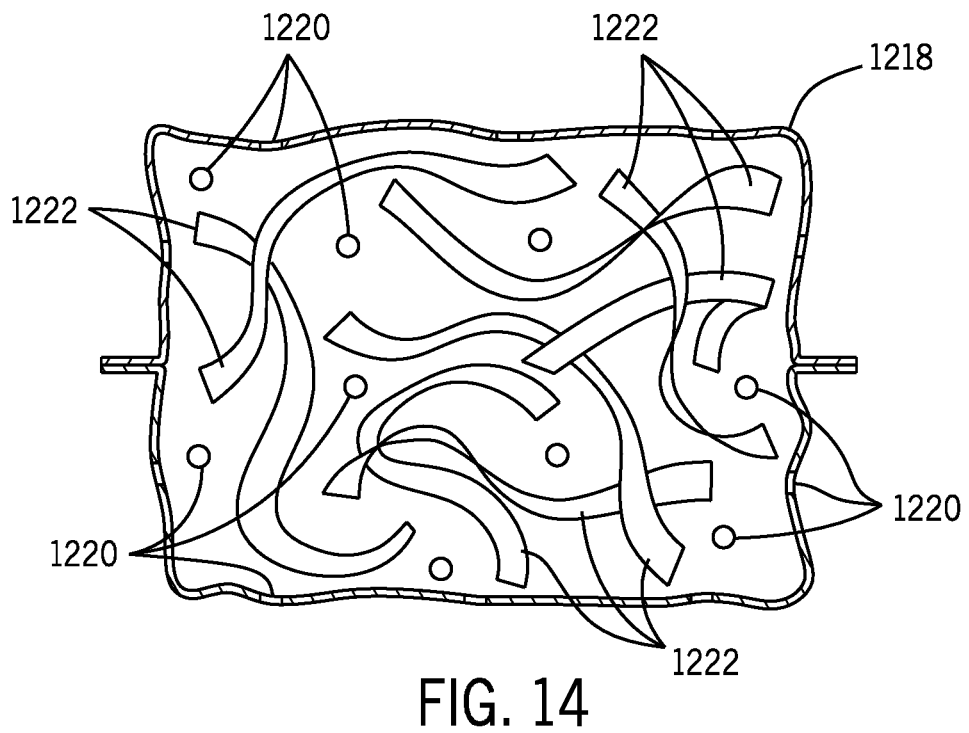
FIG. 14 illustrates a cross sectional view of a cell within a baffle of the impact absorbing mat in FIG. 12.

FIG. 12 illustrates a section of a perspective view of another example impact absorbing mat 1200. FIG. 13 illustrates a cross sectional view of the impact absorbing mat 1200 in FIG. 12 along line 13-13. FIG. 14 illustrates a cross sectional view of a cell within a baffle of the impact absorbing mat in FIG. 12. The arrow shown represents force from an object on the impact absorbing mat 1200.

Impact absorbing mat 1200 actually extends a length defined by several walls including walls 1202, 1204, 1206 that function (in part) as boundaries for several layers within mat 1200. The walls themselves function as a durable cover for the mat 1200 that are (walls) made of material such as vinyl, synthetic textile, natural textile, plastic sheet or any other durable material known to those skilled in the art. The layers within walls include a top layer 1208, a linear layer 1210 and a damper layer 1212. In this example (as opposed to the example mat 100 in FIG. 1), the linear layer 1210 is sandwiched in between the top layer 1208 and the damper layer 1212. The top layer 1208 is a solid layer constructed of a closed cell foam such as polyethylene foam or an open cell foam such as polyurethane foam.

The linear layer 1210 includes several baffles 1214 that are each configured in a cylindrical shape that extends across the mat 1200 (in a parallel to each other). Each baffle 1214 is filled with expanded polystyrene pellets, but it may be filled with other materials or the same material in different size or form to achieve desired results.

The damper layer 1212 also includes several baffles 1216 that extend across the mat 1200 in parallel to one another. Each baffle 1216 in the damper layer 1212 incorporates several holes in the walls that define the shape of the baffle 1214 to enable air to escape when the baffle 1214 is compressed. Alternatively, each baffle 1214 may be made of a material that is porous to enable air to escape when the baffle 1214 is compressed. Linear layer baffles 1214 are wedged in between, i.e., staggered with respect to damper layer baffles 1216. This construction creates air pockets or cavities between the linear layer 1210 and damper layer 1212. This configuration helps support and maintain a compact, uniform and slender profile of impact absorbing mat 1200

The baffles 1216 of damper layer 1214 incorporate or house a number of cells 1218 similar to the cells described above that are defined by the sheeting. In this example, each cell 1218 (sheeting) forms an enclosure or balloon which functions to house several strips 1222 or other material within its walls as described in detail below. Each cell 1218 also has several small holes (apertures) 1220 in the sheeting walls thereof that enable air to escape when the cell 1218 is compressed and crumpled. Alternatively, the cells may be made of a porous material that enables air to escape through the holes (apertures) as part of the material.

As indicated above, cells 1218 each incorporate content in the form of strips 1220 that are configured in a confetti like shape. The strips 1220 are made of plastic material known as beta (β) crystalline polypropylene (BCPP). BCPP is used as the strip material for the content of each cell as it enables the impact attenuation device to return to its original shape from a compressed state when under no external loading. BCPP has unique properties which enable this happen. In this respect, the plastic strips will deform upon impact, but deformation will not decrease the strength of the strips even when the plastic exceeds its yield point. This ultimately enables the BCPP strips to maintain their elastic even upon deformation. BCPP composition and use are described in more detail below.

The layers in FIG. 12 are shown as horizontal layers when the impact absorbing mat 100 is positioned on a surface. However, these layers may be configured as vertical layers in other examples and configurations as known to those skilled in the art.

Figure 15:
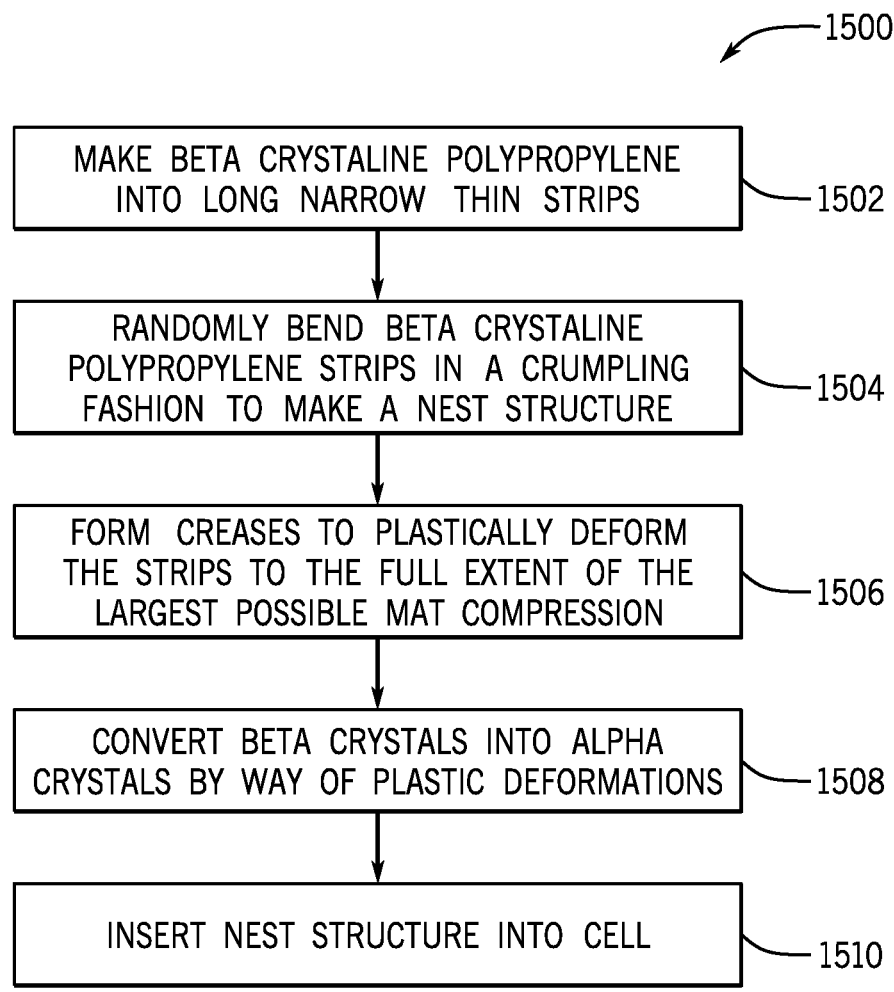
FIG. 15 illustrates example steps of the process for creating a cell for the baffle of the impact absorbing mat in FIG. 12.

FIG. 15 illustrates example steps of the process 1500 for creating a cell 1218 for the baffle 1216 as well as the strips 1220 that form the content of the cells. In this respect, execution proceeds to step 1502 wherein thin long narrow strips are made of BCPP during the manufacture process. Then, execution proceeds to step 1504 wherein the BCPP strips are randomly bent in a crumpling fashion to make a nest structure. Next, execution proceeds to step 1506 wherein creases are formed which deform the plastic strips to the full execute of the largest possible mat compression. Then, at step 1508, the beta crystals of the BCPP strips are converted into alpha (α) crystals as a result of the plastic deformation. The formation of alpha crystals ensures that the strength of the strips are maintained even after deformation. (However, in this state, the undeformed sections of the strips remain as beta (β) crystals.) Once this happens, nest structure is inserted into a cell (sheeting) and sealed at step 1510. At this stage, the cell is ready to be used.

Figure 16:
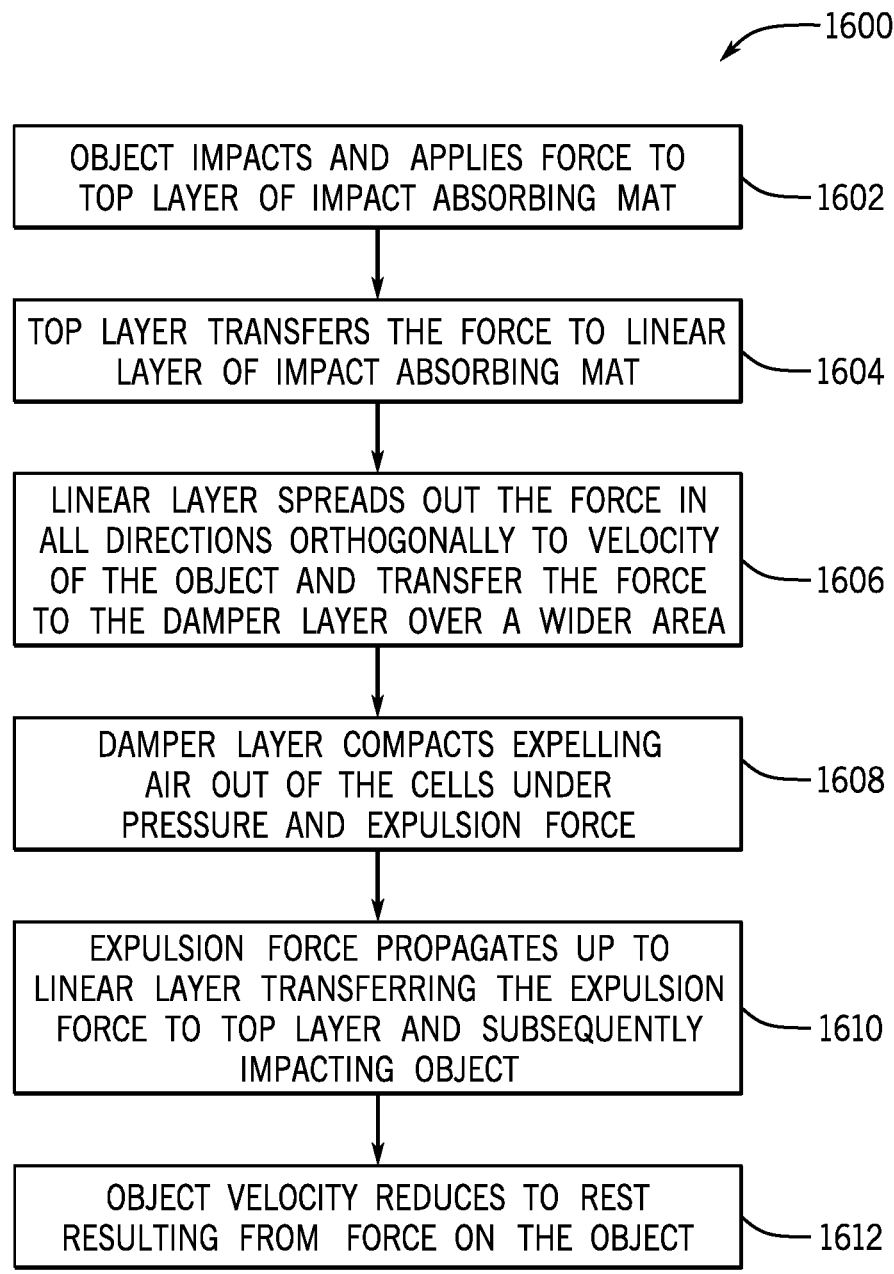
FIG. 16 illustrates a flowchart of example process steps of the operation of the impact absorbing mat of FIG. 1 upon impact of an object.

FIG. 16 illustrates a flowchart of example process steps 1600 of the operation of the impact absorbing mat of FIG. 12 upon impact of an object. In operation, at step 1602, an object impacts and applies force to the top layer 1408 of the impact absorbing mat 1200. At step 1604, the top layer 1408 transfers the force to the linear layer 1210 of the impact absorbing mat 1200. (However, force on the top layer has negligible effect on the impact of the object.) Then, at step 1606, the linear layer spreads out the force in all directions orthogonally with respect to the direction of velocity of the object (i.e., perpendicular to direction of object). As a result, the force is transferred to the damper layer 1212 over a wider area. The damper layer 1212 compacts thereby expelling air out of the cells under pressure and expulsion force at step 1608. (As indicated above, the baffle fabric material is porous or has holes to enable air to pass.) At step 1610, the expulsion force propagates up to the linear layer 1210 and transfers the expulsion force to the top layer 1208, thereby impacting the object. As a result, the object's velocity reduces until the object rests, resulting from the force on the object. The steps described in FIG. 16 depict the actions or reactions by the impact absorbing mat 1200 resulting from an object impact.

Figure 17:
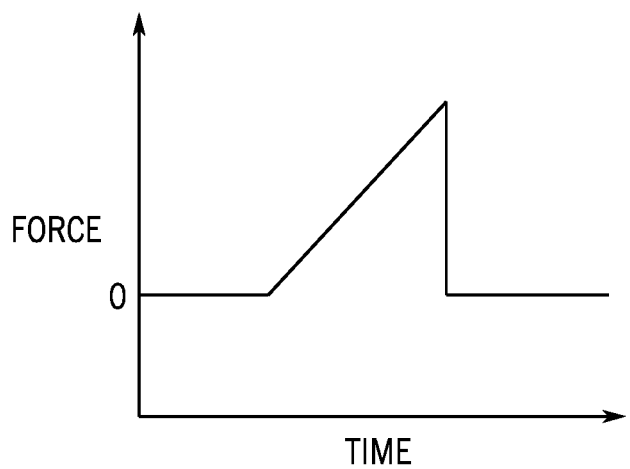
FIGS. 17-19 illustrates graphs of force exerted to layers over time of the impact absorbing mat of FIG. 12.
Figure 18:
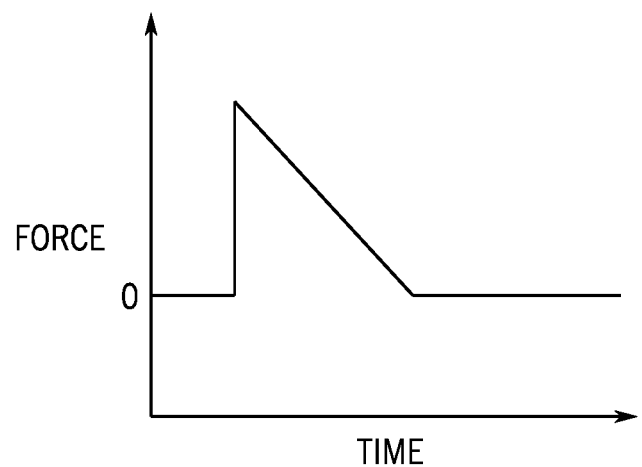
Figure 19:
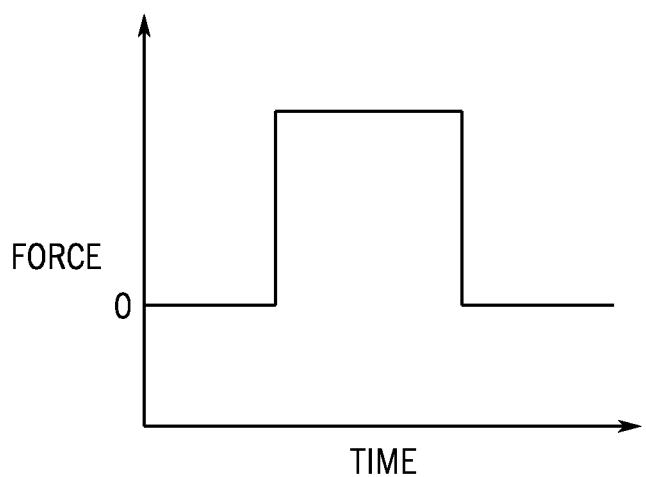

FIGS. 17-19 illustrates graphs of force over time for certain layers of the impact absorbing mat 1200 of FIG. 12. In FIG. 17, the force on the object by the linear layer 1210 is generally increasing linearly as time progresses while the force on the object decreases linearly by the damper layer over time (FIG. 18). FIG. 19 represents the ideal force on the object by a perfect mat. The impact absorbing mat 1200 generally produces the results shown in these graphs as a result of the layer structure and composition of baffles.

It is to be understood that the disclosure teaches examples of the illustrative embodiments and that many variations of the invention can easily be devised by those skilled in the art after reading this disclosure and that the scope of the present invention is to be determined by the claims below.

What is claimed is:

1. An impact absorbing mat configured to be placed on a surface for decelerating and absorbing an impact of a user falling thereon, the impact absorbing mat comprising:
    a generally planar top surface exposed upwardly so as to receive the impact of the user impacting the top surface wherein the user has an impact velocity relative to the top surface;
    the top surface having a pre-impact condition, and being supported on a first layer and a second layer layered one on the other such that the impact of said user causes the top surface to undergo downward deformation below the pre-impact condition and to compress the first and second layers;
    said first layer including one or more baffles configured to undergo compression in response to the impact of the user and the downward deformation of the top surface, wherein said compression causes increased pressure in the one or more baffles that increases compression resistance of the one or more baffles such that the one or more baffles exert a first decelerating force that decelerates the user after the impact, wherein the first decelerating force increases as the one or more baffles are compressed; and
    the second layer including one or more baffles layered on the one or more baffles of the first layer, wherein the one or more baffles of the second layer are configured to undergo compression that causes a change from an original shape thereof when the top surface is in the pre-impact condition without the downward deformation to a compressed shape thereof in response to the compression of the one or more baffles of the first layer responsive to the impact and the downward deformation of the top surface, and
    wherein the one or more baffles of the second layer are configured to decompress and return to the original shape thereof when the compression of the impact absorbing device by the impact and weight of the user having fallen thereon is no longer present, and the top layer returns to the pre-impact condition thereof without any of the downward deformation;
    wherein the one or more baffles of the second layer each include:
        (1) one or more air outlet/inlets each having an aperture open at all times and allowing air to flow out of the baffle at all times, said aperture being configured to cause restriction of air displacement that passes therethrough during compression of each baffle; and
        (2) a content material in each baffle that is configured to absorb energy of the impact and to expand after compression of each baffle so that each baffle returns to the original shape thereof;
    wherein, upon initial compression of the one or more baffles of the second layer on the impact of the user, air flows through the aperture of the one or more baffles of the second layer and pressure is increased in the one or more baffles of the second layer as a result of the restriction of air displacement by the aperture of the one or more air outlet/inlets in the one or more baffles of the second layer; and
    wherein the increased pressure in the one or more baffles of the second layer provides compression resistance of the one or more baffles thereof, such that the second layer exerts a second decelerating force that decelerates the velocity of the falling user, said second decelerating force decreasing as the compression of the one or more baffles of the second layer causes air displacement of air flowing through the aperture of the one or more air inlet/outlets out of the baffle until the pressure in the baffle drops to a level of ambient air pressure around the impact absorbing mat and slows the velocity of the user.

2. The impact absorbing mat of claim 1, wherein the top surface is supported on a third layer supported on the one or more baffles of the first layer and the second layer, wherein the third layer is of a foam material that is configured to compress upon the impact of the user and to distribute the force of the impact of the user over an area of the mat.

3. The impact absorbing mat of claim 1, wherein the one or more baffles of the first layer or the second layer comprise one or more sheetings, as the content material, that are arranged within the one or more baffles so as to form one or more air-filled cells respectively, wherein the one or more sheetings includes apertures that enable air to pass through upon the impact of the user on the top surface.

4. The impact absorbing mat of claim 1, wherein the one or more baffles of the first layer or the second layer comprise one or more cells, each cell housing the content material configured to compress in response to compression of the one or more baffles of the first layer or the second layer.

5. The impact absorbing mat of claim 1, wherein the content material is beta (β) crystalline polypropylene.

6. The impact absorbing mat of claim 1, wherein the second layer is a damper layer.

7. The impact absorbing mat of claim 1, wherein the first layer is a linear layer.

8. The impact absorbing mat of claim 3, wherein the air-filled cells are formed by the surfaces of said sheeting that has been crumpled and balled.

9. The impact absorbing mat of claim 3, wherein the sheeting is plastic.

10. An impact absorbing mat adapted to be placed on a surface for decelerating and absorbing an impact of a user falling thereon, the mat comprising:
    a top surface having a generally planar configuration, said top surface being supported to receive the impact of the user falling at a velocity thereon, and to deform downwardly from the generally planar configuration by one or more baffles each configured to undergo compression and to change from a respective original uncompressed shape in which the top surface supported thereon has the generally planar configuration to a respective compressed shape in response to the impact of the user in which the top surface is deformed downwardly, and to return to the original uncompressed shape when the compression from the impact or weight of the user is no longer present, so that the top surface returns to the generally planar configuration, wherein the impact absorbing device can receive and decelerate and absorb subsequent further impacts;

wherein the one or more baffles each includes one or more air outlet/inlets each having an aperture that is open and allows air to flow out of the baffle at all times, said aperture being configured to restrict air displacement flowing out of each baffle when the baffle is compressed by the impact, and content material in each baffle that absorbs energy of the impact;

wherein, upon compression of the one or more baffles, air flows out thereof through the aperture with pressure in the one or more baffles being increased as a result of restriction of air displacement from the air outlet/inlets and the content material in the one or more baffles upon the compression of the one or more baffles; and wherein air flows out of the one or more baffles through the aperture until pressure in the one or more baffles reaches ambient pressure around the mat;

wherein increased pressure in the one or more baffles causes compression resistance of the one or more baffles to the deformation downward of the top layer by causing the one or more baffles to exert a force that decelerates the user; and wherein the one or more baffles includes one or more cells formed of the content material and wherein the content material is configured to compress in response to compression of the impact of the user and to expand the one or more baffles after termination of said compression.

11. The impact absorbing mat of claim 10 wherein the content material within the one or more cells cell is beta (β) crystalline polypropylene.

12. The impact absorbing mat of claim 10 wherein the one or more baffles includes an air permeable material defining walls of the one or more baffles.

13. The impact absorbing mat of claim 10 wherein the one or more baffles includes an air permeable material defining walls of the one or more baffles.

14. An impact absorbing mat configured to be placed on a surface for decelerating a user falling onto the mat, said mat comprising:

a first deformable layer; and a second deformable layer layered on the first layer;

an upwardly disposed top surface supported on the first and second layers;

said top surface being configured to receive an impact of a part of the user falling onto the mat at an impact velocity relative to the top surface so as to deform downward and decelerate the part of the user;

one of the first and second layers being a damper layer and the other of the first and second layers being a linear layer;

the damper layer and the linear layer each having a respective vertical thickness, and each of said layers undergoing deformation responsive to the impact of the part of the user on the top surface so as to reduce the vertical thickness thereof, and so as to decelerate the part of the user from the impact velocity thereof;

wherein the damper layer and the linear layer each provides a respective counter force against the part of the user impacting the top surface so that the impact velocity of the part of the user is decelerated as the top surface deforms downwardly;

the linear layer being configured such that the counter force against the part of the user increases as the deformation thereof increases and the velocity of the part of the user is decelerated; and said damper layer being structured so that the counter force against the part of the user decreases as the deformation thereof increases and the velocity of the part of the user is decelerated; and wherein the damper layer comprises baffles each having at least one air outlet structure, said air outlet structures each havinci an aperture that is configured to allow air to flow therethrough out of the baffle at any time that the pressure in the baffle is greater than pressure outside the baffle;

wherein the aperture restricts the air flowing therethrough to a restrictive flow of air such that a downward compressive force applied on the baffle due to the impact of the part of the user creates an increase of air pressure in the baffle that provides a resistance force opposing the compression due to the restriction of air flow out of the baffle, and wherein said resistance force reduces as the damper layer is compressed until pressure of air in the baffle reaches pressure outside the baffle and air ceases to flow through the aperture.

15. The impact absorbing mat of claim 14, wherein the baffles of the damper layer each contain therein material that exerts a force that causes the baffles to expand after the compressive force is removed and to admit air into the baffle such that the baffles return to an original dimension thereof and the damper layer returns to the top surface to a position thereof prior to the impact so as to receive subsequent impacts and provide deceleration thereof.

16. The impact absorbing mat of claim 15, wherein the material in the baffles of the damper layer is sheeting therein that forms cells in the baffles.

17. The impact absorbing mat of claim 14, wherein the mat further comprises a third layer of foam material overlying the first and second layers and supporting the top surface, said third layer distributing force of the impact of the user over an area of the first and second layers.

18. The impact absorbing mat of claim 15, wherein the air is admitted into the baffles through the apertures to return the baffles to an original dimension thereof.

* * * * *